United States Patent
Seomoon et al.

(10) Patent No.: US 11,036,298 B2
(45) Date of Patent: Jun. 15, 2021

(54) DISPLAY DEVICE WHICH GENERATES A DIFFERENT VIBRATION ACCORDING TO THE POSITION WHERE A FORCE IS APPLIED BY A USER

(71) Applicant: Samsung Display Co., Ltd., Yongin-si (KR)

(72) Inventors: Hee Seomoon, Hwaseong-si (KR); Won Ki Hong, Suwon-si (KR); Sung Kook Park, Suwon-si (KR); So Hee Park, Cheonan-si (KR); Tae Hee Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/508,366

(22) Filed: Jul. 11, 2019

(65) Prior Publication Data
US 2020/0057503 A1    Feb. 20, 2020

(30) Foreign Application Priority Data
Aug. 17, 2018  (KR) .......................... 10-2018-0095822

(51) Int. Cl.
*G06F 3/041* (2006.01)
*G06F 3/01* (2006.01)
*G06F 3/044* (2006.01)

(52) U.S. Cl.
CPC .............. *G06F 3/016* (2013.01); *G06F 3/044* (2013.01); *G06F 3/0412* (2013.01); *G06F 3/0414* (2013.01); *G06F 3/0416* (2013.01); *G06F 3/04142* (2019.05); *G06F 2203/04102* (2013.01); *G06F 2203/04105* (2013.01)

(58) Field of Classification Search
CPC .... G06F 3/0414; G06F 3/04142; G06F 3/016; G06F 3/044
See application file for complete search history.

(56) References Cited

U.S. PATENT DOCUMENTS

| | | | |
|---|---|---|---|
| 7,538,760 B2 | 5/2009 | Hotelling et al. | |
| 8,654,524 B2 | 2/2014 | Pance et al. | |
| 8,686,952 B2 | 4/2014 | Burrough et al. | |
| 8,787,006 B2 | 7/2014 | Golko et al. | |
| 9,182,820 B1* | 11/2015 | Hebenstreit | G09B 21/003 |
| 2010/0220065 A1* | 9/2010 | Ma | G06F 3/0414 |
| | | | 345/173 |
| 2010/0328229 A1* | 12/2010 | Weber | G06F 3/0414 |
| | | | 345/173 |
| 2014/0028575 A1 | 1/2014 | Parivar et al. | |
| 2014/0085213 A1 | 3/2014 | Huppi et al. | |

(Continued)

FOREIGN PATENT DOCUMENTS

KR   10-2019-0132586    11/2019

*Primary Examiner* — Xuemei Zheng
(74) *Attorney, Agent, or Firm* — H.C. Park & Associates, PLC

(57) ABSTRACT

A display device including a display panel; a first force sensor and a second force sensor disposed below the display panel; and a first vibration generator and a second vibration generator disposed below the display panel. The first vibration generator vibrates when a force is applied to the first force sensor, and the second vibration generator vibrates when a force is applied to the second force sensor. The vibration of the first vibration generator is different from the vibration of the second vibration generator.

20 Claims, 29 Drawing Sheets

(56) References Cited

U.S. PATENT DOCUMENTS

| | | |
|---|---|---|
| 2014/0091857 A1 | 4/2014 | Bernstein |
| 2014/0092064 A1 | 4/2014 | Bernstein et al. |
| 2014/0293145 A1 | 10/2014 | Jones et al. |
| 2018/0210598 A1* | 7/2018 | Lu .................. G06F 3/04142 |
| 2019/0353540 A1 | 11/2019 | Hong et al. |

* cited by examiner

DISPLAY DEVICE WHICH GENERATES A DIFFERENT VIBRATION ACCORDING TO THE POSITION WHERE A FORCE IS APPLIED BY A USER

This application claims priority from and the benefit of Korean Patent Application No. 10-2018-0095822, filed on Aug. 17, 2018, which is hereby incorporated by reference for all purposes as if fully set forth herein.

BACKGROUND

Field

Exemplary embodiments of the invention relate generally to a display device.

Discussion of the Background

Electronic devices that provide images to a user, such as a smartphone, a tablet PC, a digital camera, a notebook computer, a navigation system, and a smart television, include a display device for displaying images. The display device includes a display panel that generates and displays an image and various input devices.

Recently, a touch panel that recognizes a touch input has been widely applied to display devices, mainly in smartphones and tablet PCs. Due to the convenience of a touch method, the touch panel is replacing an existing physical input device such as a keypad. Further development of touch panels has resulted in attempts being made to implement various inputs by installing a force sensor in a display device. Further, a vibration generator is being applied to a display device in order to implement a haptic function, and research is being made to implement the haptic function by connecting a vibration generator to a touch panel or a force sensor.

The above information disclosed in this Background section is only for understanding of the background of the inventive concepts, and, therefore, it may contain information that does not constitute prior art.

SUMMARY

Exemplary embodiments of the invention provide a display device which generates a different vibration according to the position where a force is applied by a user.

Additional features of the inventive concepts will be set forth in the description which follows, and in part will be apparent from the description, or may be learned by practice of the inventive concepts An exemplary embodiment of the invention provides a display device including a display panel; a first force sensor and a second force sensor disposed below the display panel; and a first vibration generator and a second vibration generator disposed below the display panel. The first vibration generator vibrates when a force is applied to the first force sensor, and the second vibration generator vibrates when a force is applied to the second force sensor. The vibration of the first vibration generator may be different from the vibration of the second vibration generator.

The first vibration generator may be disposed adjacent to the first force sensor, and the second vibration generator may be disposed adjacent to the second force sensor.

The first force sensor may be disposed outside the first vibration generator, and the second force sensor may be disposed outside the second vibration generator.

Each of the first force sensor and the second force sensor may include a plurality of force sensing cells.

The first vibration generator may vibrate differently when a force is applied to any one of the force sensing cells and when a force is applied to another one of the force sensing cells.

The first vibration generator may be disposed adjacent to any one of the force sensing cells of the first force sensor and further includes a third vibration generator disposed adjacent to another one of the force sensing cells of the first force sensor.

The first vibration generator may vibrate when a force is applied to any one of the force sensing cells of the first force sensor, and the third vibration generator may vibrate when a force is applied to another one of the force sensing cells. The vibration of the first vibration generator may be different from the vibration of the third vibration generator.

The second vibration generator may be disposed adjacent to any one of the force sensing cells of the second force sensor and further includes a fourth vibration generator disposed adjacent to another one of the force sensing cells of the second force sensor.

The second vibration generator may vibrate when a force is applied to any one of the force sensing cells of the second force sensor, and the fourth vibration generator may vibrate when a force is applied to another one of the force sensing cells of the second force sensor. The vibration of the second vibration generator may be different from the vibration of the fourth vibration generator.

The display device further may include a lower cover disposed below the display panel; and a fifth vibration generator disposed on an upper surface of the lower cover.

Any one of the force sensing cells may have a first area, and another one of the force sensing cells may have a second area. The second area is may be larger than the first area.

The first vibration generator may vibrate when a force is applied to any one of the force sensing cells of the first force sensor, and the fifth vibration generator may vibrate when a force is applied to another one of the force sensing cells of the first force sensor. The vibration of the first vibration generator may be different from the vibration of the fifth vibration generator.

A maximum vibration displacement of the first vibration generator may be different from that of the second vibration generator.

Duration of the vibration of the first vibration generator may be different from that of the vibration of the second vibration generator.

A waveform of the vibration of the first vibration generator may be different from that of the vibration of the second vibration generator.

A period of the vibration of the first vibration generator may be different from that of the vibration of the second vibration generator.

Another exemplary embodiment of the invention provides a display device including a display panel; a first force sensor and a second force sensor disposed below the display panel; and a first vibration generator disposed below the display panel. The first vibration generator vibrates when a force is applied to the first force sensor and the second force sensor. The first vibration generator vibrates differently when a force is applied to the first force sensor and when a force is applied to the second force sensor.

The first force sensor may be disposed on a side of the display panel, the second force sensor may be disposed on the other side of the display panel, and the first vibration generator may be disposed between the first force sensor and the second force sensor.

Each of the first force sensor and the second force sensor may include a plurality of force sensing cells, and the first vibration generator may vibrate differently when a force is applied to any one of the force sensing cells of the first force sensor and when a force is applied to another one of the force sensing cells.

The display device may further include a second vibration generator disposed below the display panel and disposed between the first force sensor and the second force sensor. The first vibration generator may vibrate when a force is applied to any one of the force sensing cells of the first force sensor, and the second vibration generator may vibrate when a force is applied to another one of the force sensing cells of the first force sensor, the vibration of the first vibration generator may be different from the vibration of the second vibration generator.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
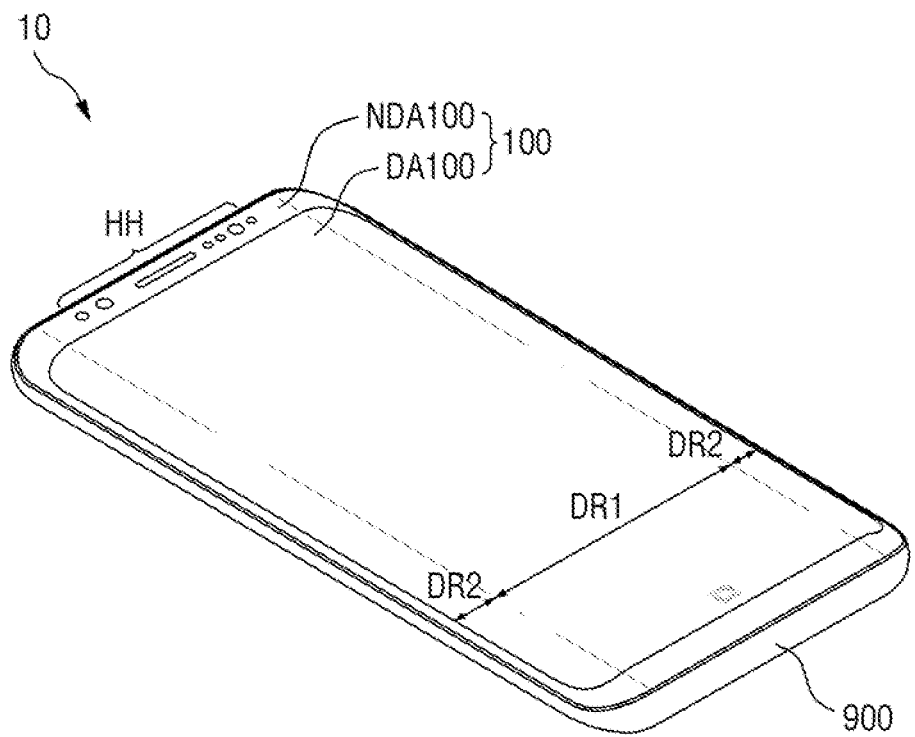
FIG. 1 is a perspective view of a display device according to an exemplary embodiment.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

It will be apparent to those skilled in the art that various modifications and variations can be made to the disclosed embodiments without departing from the spirit and scope of the inventive concepts. Thus, it is intended that the inventive concepts cover the modifications and variations of the disclosed embodiments provided they come within the scope of the appended claims and their equivalents.

Figure 2:
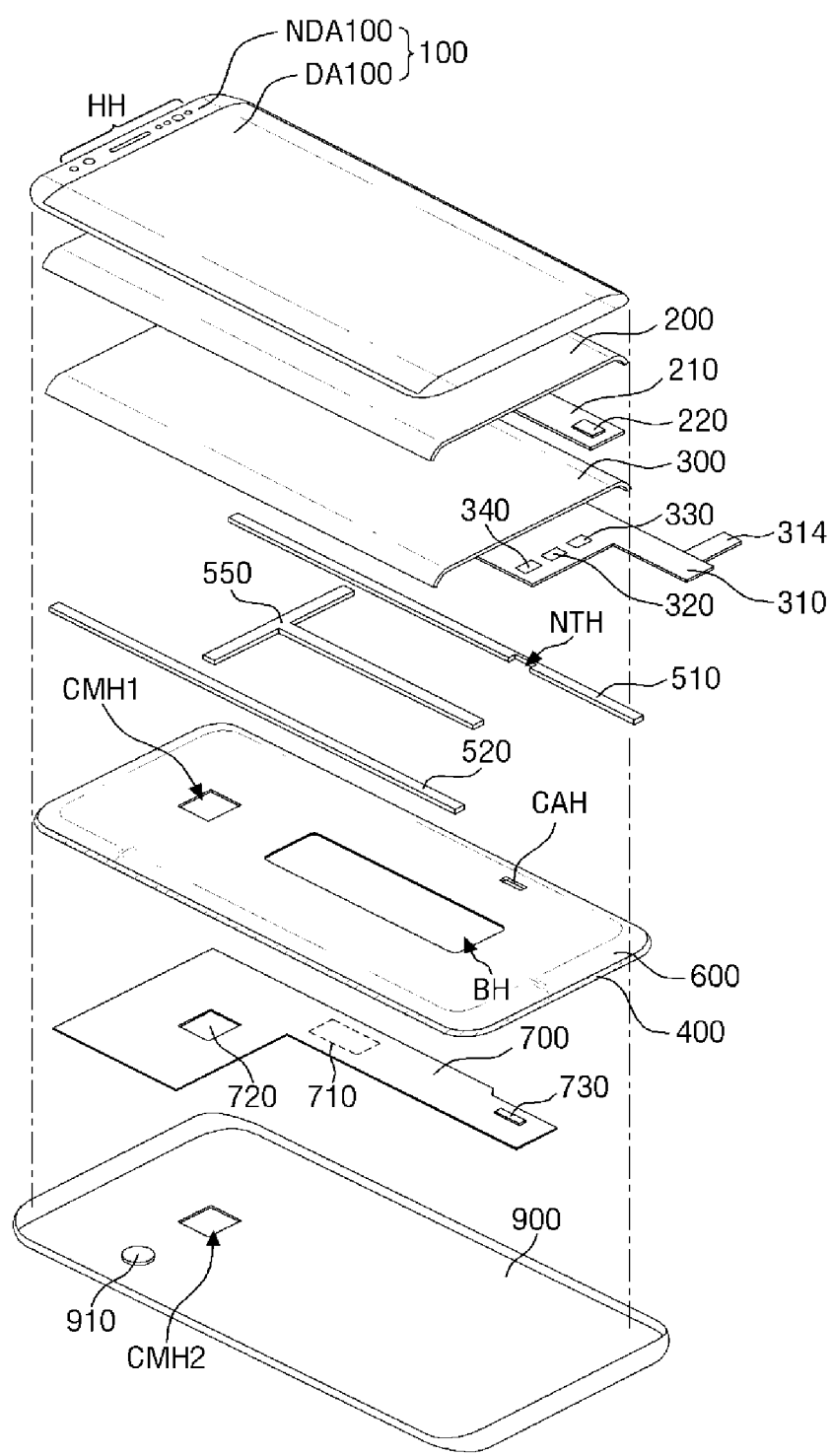
FIG. 2 is an exploded perspective view of the display device according to an exemplary embodiment.
Figure 3:
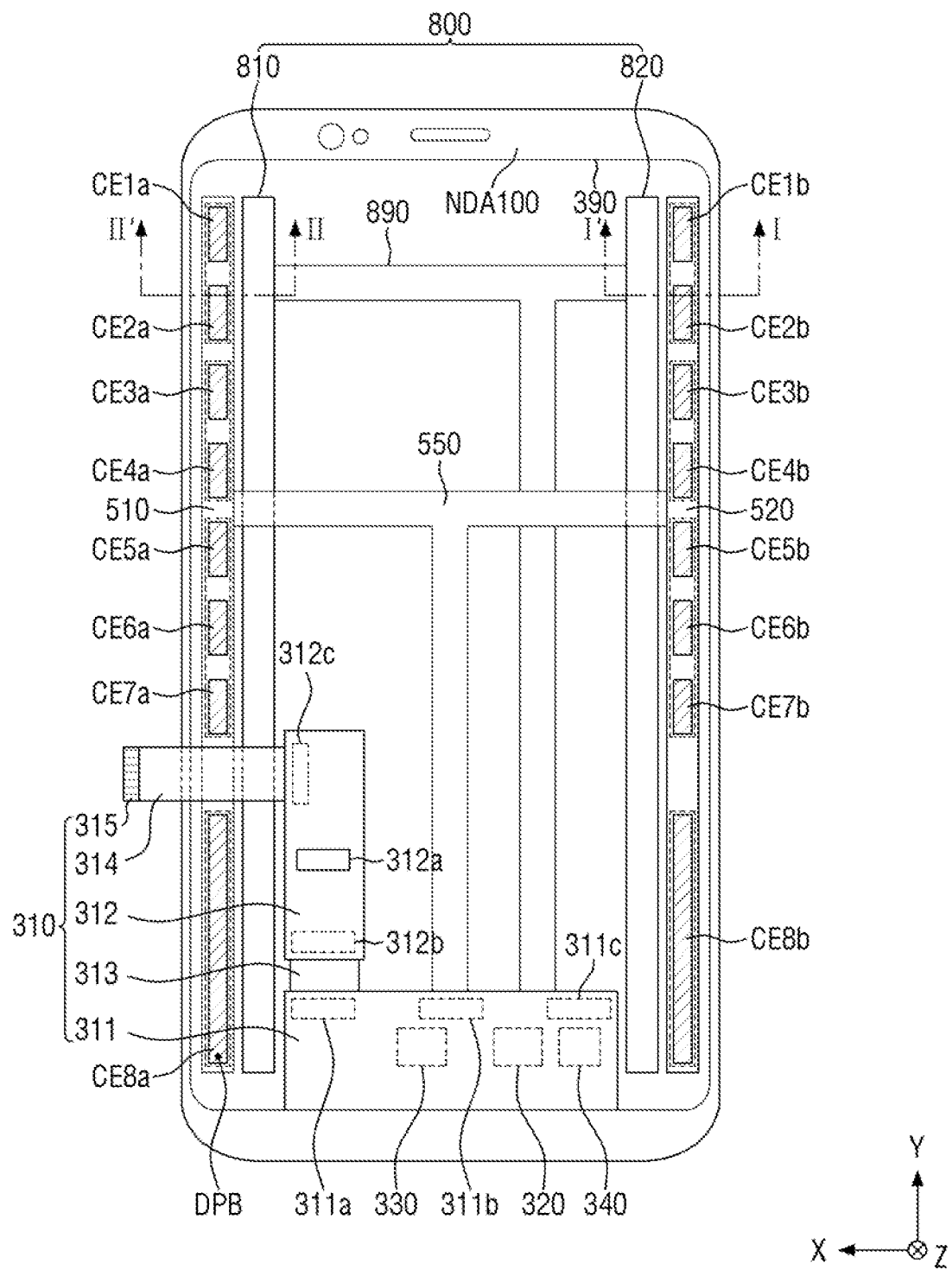
FIG. 3 is a bottom view of a display panel attached to a cover window according to an exemplary embodiment.

FIG. 1 is a perspective view of a display device 10 according to an exemplary embodiment. FIG. 2 is an exploded perspective view of the display device 10 according to an exemplary embodiment. FIG. 3 is a bottom view of a display panel 300 attached to a cover window 100 according to an exemplary embodiment.

Referring to FIGS. 1 through 3, the display device 10 according to an exemplary embodiment includes the cover window 100, a touch sensing device 200, a touch circuit board 210, a touch driving unit 220, the display panel 300, a display circuit board 310, a display driving unit 320, a waterproof member 400, a first force sensor 510, a second force sensor 520, a middle frame 600, a main circuit board 700, vibration generators 800, and a lower cover 900.

Figure 13:
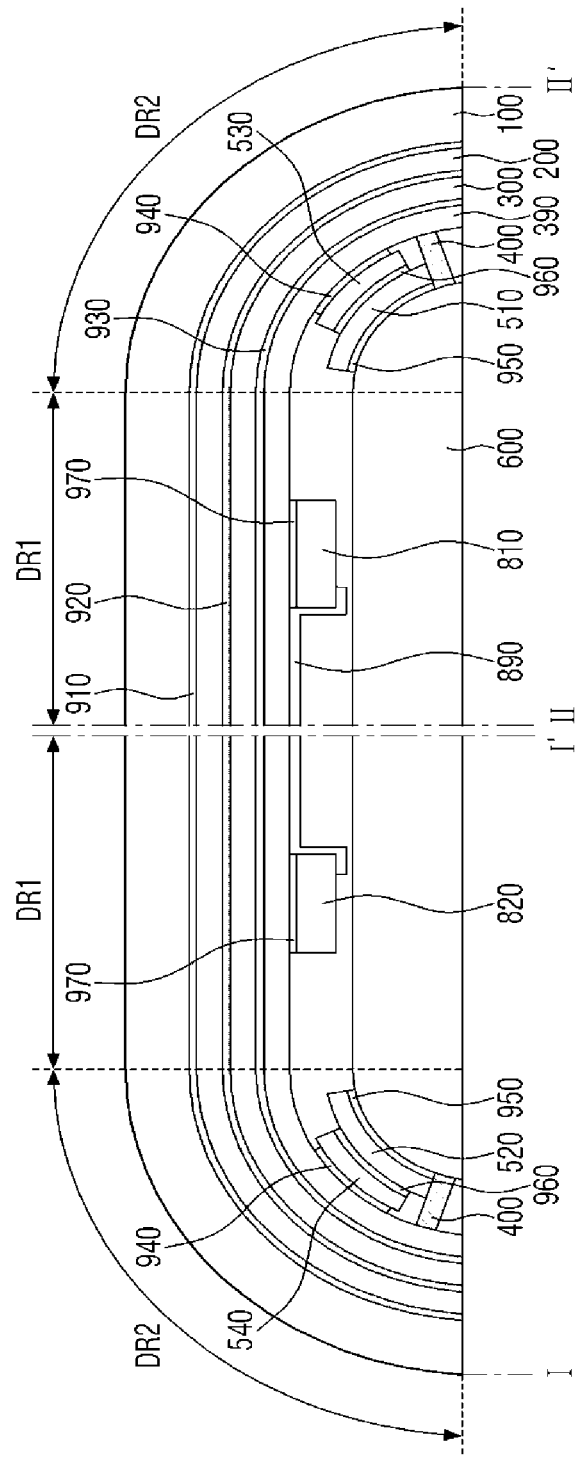
FIG. 13 is a cross-sectional view illustrating an example of I-I' and II-II' of FIGS. 3 and 4.

The vibration generators 800 may include a first vibration generator 810 and a second vibration generator 820. The first vibration generator 810 and the second vibration generator 820 may be attached to the lower surface of under-panel member 390, as illustrated in FIG. 3, and under-panel member 390 may be disposed below the display panel 300, as illustrated in FIG. 13.

In the present specification, the terms "above", "top" and "upper surface" indicate a direction in which the cover window 100 is disposed with respect to the display panel 300, that is, a Z-axis direction, and the terms "below," "bottom" and "lower surface" indicate a direction in which the middle frame 600 is disposed with respect to the display panel 300, that is, a direction opposite to the Z-axis direction. In addition, "left," "right," "upper" and "lower" indicate directions when the display panel 300 is viewed in a plane. For example, "left" indicates a direction opposite to an X-axis direction, "right" indicates the X-axis direction, "upper" indicates a Y-axis direction, and "lower" indicates a direction opposite to the Y-axis direction.

The display device 10 may be rectangular in plan view. For example, the display device 10 may have a rectangular planar shape having short sides in a first direction (X-axis direction) and long sides in a second direction (Y-axis direction) as illustrated in FIGS. 1 and 2. Each corner where a short side extending in the first direction (X-axis direction) meets a long side extending in the second direction (Y-axis direction) may be round with a predetermined curvature or may be right-angled. The planar shape of the display device 10 is not limited to the rectangular shape, but may also be another polygonal shape, a circular shape, or an elliptical shape.

The display device 10 may include a first area DR1 formed flat and a second area DR2 extending from right and left sides of the first area DR1. The first area DR1 may be a flat portion. The second area DR2 may be formed flat or curved. The second area DR2 may be a bending portion. The second area DR2 may lie in a plane different from a plane in which the first area DR1 is located. When the second area DR2 is formed flat, an angle formed by the first area DR1 and the second area DR2 may be an obtuse angle. When the second area DR2 is formed curved, it may have a constant curvature or a varying curvature.

In FIG. 1, the second area DR2 extends from each of the right and left sides of the first area DR1. However, the inventive concepts are not limited to this case. That is, the second area DR2 may also extend from only one of the right and left sides of the first area DR1. Alternatively, the second area DR2 may extend not only from the right and left sides of the first area DR1 but also from at least any one of upper and lower sides of the first area DR1. In the following description, a case where the second area DR2 is disposed at right and left edges of the display device 10 will be mainly described.

The cover window 100 may be disposed above the display panel 300 to cover an upper surface of the display panel 300. Thus, the cover window 100 may function to protect the upper surface of the display panel 300. The cover window 100 may be attached to the touch sensing device 200 by a first adhesive member 910, as illustrated in FIG. 13. The first adhesive member 910 may be an optically clear adhesive film (OCA) or an optically clear resin (OCR).

The cover window 100 may include a transmissive portion DA100 corresponding to the display panel 300 and a light shielding portion NDA100 corresponding to an area other than the display panel 300. The cover window 100 may be disposed in the first area DR1 and the second areas DR2, and the transmissive portion DA100 may be disposed in a part of the first area DR1 and a part of each of the second areas DR2. The light shielding portion NDA 100 may be formed opaque. Alternatively, the light shielding portion NDA100 may be formed as a decoration layer having a pattern that is shown to a user when an image is not displayed. For example, a company's logo, such as "SAMSUNG" or various other characters, may be patterned in the light shielding portion NDA100.

Holes HH for exposing a front camera, a front speaker, an infrared sensor, an ultrasonic sensor, an illuminance sensor, etc. may be formed in the shielding portion NDA100 of the cover window 100. However, the inventive concepts are not limited to this case. For example, some or all of the front camera, the front speaker, the infrared sensor, the ultrasonic sensor, and the illuminance sensor may be embedded in the display panel 300, in which case some or all of the holes HH may be removed.

The cover window 100 may be made of glass, sapphire, and/or plastic. The cover window 100 may be rigid or flexible.

The touch sensing device 200 may be disposed between the cover window 100 and the display panel 300. The touch sensing device 200 may be disposed in the first area DR1 and the second areas DR2. Therefore, a user's touch can be sensed not only in the first area DR1 but also in the second areas DR2.

The touch sensing device 200 may be attached to a lower surface of the cover window 100 by the first adhesive member 910. A polarizing film may be additionally disposed on the touch sensing device 200 in order to prevent a decrease in visibility due to reflection of external light. In this case, the polarizing film may be attached to the lower surface of the cover window 100 by the first adhesive member 910.

The touch sensing device 200 is a device for sensing a user's touch position and may be implemented as a capacitance type such as a self-capacitance type or a mutual capacitance type. The touch sensing device 200 may include only touch driving electrodes when implemented as a capacitance type, and may include touch driving electrodes and touch sensing electrodes when implemented as a mutual capacitance type. The touch sensing device 200 implemented as a mutual capacitance type will be mainly described below.

The touch sensing device 200 may be formed in the form of a panel or a film. In this case, the touch sensing device 200 may be attached onto a thin-film encapsulation layer of the display panel 300 by a second adhesive member 920 as illustrated in FIG. 13. The second adhesive member 920 may be an OCA or an OCR.

Alternatively, the touch sensing device 200 may be formed integrally with the display panel 300. In this case, the touch driving electrodes and the touch sensing electrodes of the touch sensing device 200 may be formed on the thin-film encapsulation layer of the display panel 300.

The touch circuit board 210 may be attached to a side of the touch sensing device 200. Specifically, the touch circuit board 210 may be attached onto pads provided on a side of the touch sensing device 200 using an anisotropic conductive film. In addition, a touch connection unit may be provided at an end of the touch circuit board 210. The touch connection unit may be connected to a connector of the display circuit board 310. The touch circuit board 210 may be a flexible printed circuit board.

The touch driving unit 220 may transmit touch driving signals to the touch driving electrodes of the touch sensing device 200, detect sensing signals from the touch sensing electrodes of the touch sensing device 200, and calculate a user's touch position by analyzing the sensing signals. The touch driving unit 220 may be formed as an integrated circuit and mounted on the touch circuit board 210.

The display panel 300 may be disposed below the touch sensing device 200. The display panel 300 may be overlapped by the transmissive portion 100DA of the cover window 100. The display panel 300 may be disposed in the first area DR1 and the second areas DR2. Therefore, an image of the display panel 300 can be seen not only in the first area DR1 but also in the second areas DR2.

The display panel 300 may be a light emitting display panel including light emitting elements. For example, the display panel 300 may be an organic light emitting display panel using organic light emitting diodes, a micro light emitting diode display panel using micro light emitting diodes, or a quantum dot light emitting display panel including quantum dot light emitting diodes.

The display panel 300 may include a substrate, a thin-film transistor layer disposed on the substrate, a light emitting element layer, and a thin-film encapsulation layer.

Since the display panel 300 is implemented as being flexible, it may be made of plastic. In this case, the substrate may include a flexible substrate and a support substrate. The support substrate for supporting the flexible substrate may have less flexibility than the flexible substrate. Each of the flexible substrate and the support substrate may include a polymer material having flexibility. For example, each of the flexible substrate and the support substrate may be polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), or a combination of these materials.

The thin-film transistor layer is disposed on the substrate. The thin-film transistor layer may include scan lines, data lines, and thin-film transistors. Each of the thin-film transistors includes a gate electrode, a semiconductor layer, and source and drain electrodes. When a scan driving unit is formed directly on the substrate, it may be formed together with the thin-film transistor layer.

The light emitting element layer is disposed on the thin-film transistor layer. The light emitting element layer includes anodes, a light emitting layer, a cathode, and banks. The light emitting layer may include an organic light emitting layer containing an organic material. For example, the light emitting layer may include a hole injection layer, a hole transporting layer, an organic light emitting layer, an electron transporting layer, and an electron injection layer. The hole injection layer and the electron injection layer can be omitted. When a voltage is applied to the anodes and the cathode, holes and electrons move to the organic light emitting layer through the hole transporting layer and the electron transporting layer, respectively, and combine together in the organic light emitting layer, thereby emitting light. The light emitting element layer may be a pixel array layer in which pixels are formed. Thus, an area in which the light emitting element layer is formed may be defined as a display area for displaying an image. An area around the display area may be defined as a non-display area.

The encapsulation layer is disposed on the light emitting element layer. The encapsulation layer prevents penetration of oxygen or moisture into the light emitting element layer. The encapsulation layer may include at least one inorganic layer and at least one organic layer.

The display circuit board 310 may be attached to a side of the display panel 300. Specifically, the display circuit board 310 may be attached onto pads provided on a side of the display panel 300 using an anisotropic conductive film. The touch circuit board 210 may be bent toward a lower surface of the display panel 300, and the touch connection unit disposed at an end of the touch circuit board 210 may be connected to the connector of the display circuit board 310. The display circuit board 310 will be described in detail later with reference to FIGS. 3 and 4.

The display driving unit 320 outputs signals and voltages for driving the display panel 300 through the display circuit board 310. The display driving unit 320 may be formed as an integrated circuit and mounted on the display circuit board 310. However, the present disclosure is not limited to this case. For example, the display driving unit 320 may be attached to a side of an upper or lower surface of the substrate of the display panel 300.

An under-panel member 390 may be disposed below the display panel 300 as illustrated in FIG. 13. The under-panel member 390 may be attached to the lower surface of the display panel 300 by a third adhesive member 930. The third adhesive member 930 may be an OCA or an OCR.

The under-panel member 390 may include at least one of a light absorbing member for absorbing light incident from the outside, a buffer member for absorbing external impact, a heat dissipating member for efficiently dissipating the heat of the display panel 300, and a light shielding layer for blocking light incident from the outside.

The light absorbing member may be disposed below the display panel 300. The light absorbing member blocks transmission of light to prevent components disposed under the light absorbing member, that is, the first force sensor 510, the second force sensor 520, the display circuit board 310, etc. from being seen from above the display panel 300. The light absorbing member may include a light absorbing material, such as a black pigment or dye.

The buffer member may be disposed below the light absorbing member. The buffer member absorbs external impact to prevent the display panel 300 from being damaged. The buffer member may be composed of a single layer or a plurality of layers. For example, the buffer member may be made of a polymer resin, such as polyurethane, polycarbonate, polypropylene, or polyethylene or may be made of an elastic material, such as a sponge formed by foaming a rubber, a urethane-based material or an acrylic-based material. The buffer member may be a cushion layer.

The heat dissipating member may be disposed below the buffer member. The heat dissipating member may include a first heat dissipating layer containing graphite or carbon nanotubes and a second heat dissipating layer formed of a metal thin film (such as copper, nickel, ferrite or silver) capable of shielding electromagnetic waves and having high thermal conductivity.

The first force sensor 510 and the second force sensor 520 may be disposed in the second areas DR2. That is, the first force sensor 510 may be disposed below the display panel 300 at a right edge of the display panel 300. The second force sensor 520 may be disposed below the display panel 300 at a left edge of the display panel 300. The first force sensor 510 and the second force sensor 520 may be arranged to face each other in the first direction (X-axis direction). The first force sensor 510 and the second force sensor 520 may be arranged opposite each other. The first force sensor 510 and the second force sensor 520 may extend in the second direction (Y-axis direction).

The first force sensor 510 and the second force sensor 520 may be attached to a lower surface of the under-panel member 390. The first force sensor 510 and the second force sensor 520 may be connected to the display circuit board 310 by a force sensing circuit board 550. In FIG. 3, the first force sensor 510 and the second force sensor 520 are connected to one force sensing circuit board 550. However, the inventive concepts are not limited to this case. The first force sensor 510 and the second force sensor 520 may also be connected to the display circuit board 310 by different force sensing circuit boards 550.

As illustrated in FIG. 3, a force sensing unit 330 for sensing pressure or force by driving the first force sensor 510 and the second force sensor 520 may be mounted on the display circuit board 310. In this case, the force sensing unit 330 may be formed as an integrated circuit. The force sensing unit 330 may be integrated with the display driving unit 320 to form one integrated circuit.

Alternatively, the force sensing circuit board 550 may be connected to the touch circuit board 210 rather than to the display circuit board 310. In this case, the force sensing unit 330 may be mounted on the touch circuit board 210. The force sensing unit 330 may be integrated with the touch driving unit 220 to form one integrated circuit.

A plurality of vibration generators may include the first vibration generator 810, the second vibration generator 820, and a third vibration generator 910. The first vibration generator 810 and the second vibration generator 820 may be attached to the lower surface of the under-panel member 390, as illustrated in FIG. 3. The third vibration generator 910 may be disposed on an upper surface of the lower cover 900.

The first vibration generator 810 may be disposed adjacent to the first force sensor 510, and the second vibration generator 820 may be disposed adjacent to the second force sensor 520.

The first force sensor 510 may be disposed closer to a first side end of the display panel 300 than the first vibration generator 810. The second force sensor 520 may be disposed closer to a second side end of the display panel 300 than the second vibration generator 820. As illustrated in FIG. 2, the first side of the display panel 300 may be the right side, and the second side of the display panel 300 may be the left side.

The first vibration generator 810 and the second vibration generator 820 may be connected to a vibration driving unit 340 of the display circuit board 310 by a fourth circuit board 890. In FIG. 3, the first vibration generator 810 and the second vibration generator 820 are connected to one fourth circuit board 890. However, the inventive concepts are not limited to this case. That is, the display device 10 may also include a plurality of fourth circuit boards 890, and the first vibration generator 810 and the second vibration generator 820 may be connected to the display circuit board 310 by different fourth circuit boards 890.

As illustrated in FIGS. 2 and 3, the vibration driving unit 340 for driving the first vibration generator 810 and the second vibration generator 820 may be mounted on the display circuit board 310. In this case, the vibration driving unit 340 may be formed as an integrated circuit. Alternatively, the vibration driving unit 340 may be mounted on the fourth circuit board 890.

The vibration driving unit 340 may generate first driving voltages and second driving voltages for driving the first vibration generator 810 and the second vibration generator 820 in response to vibration data received from a main processor 710. The vibration data of the main processor 710 may be provided to the vibration driving unit 340 via the main circuit board 700 and a second connection cable 314, a second circuit board 312, a first connection cable 313 and a first circuit board 311 of the display circuit board 310. The first driving voltages and the second driving voltages of the vibration driving unit 340 may be provided to the first vibration generator 810 and the second vibration generator 820 via the first circuit board 311 and the fourth circuit board 890.

The vibration driving unit 340 may include a digital signal processor (DSP) for processing vibration data (i.e., digital signals), a digital-analog converter (DAC) for converting the vibration data (i.e., the digital signals) processed by the DSP into first driving voltages and second driving voltages (i.e., analog signals), and an amplifier (AMP) for amplifying the first driving voltages and the second driving voltages (i.e., the analog signals) output from the DAC and outputting the amplified first and second driving voltages.

The main processor 710 may control the first and second vibration generators 810 and 820 to have different vibration intensities (or vibration displacements), vibration periods (or frequencies), vibration displacements (or waveforms) over time, and durations. For example, the vibration of the first vibration generator 810 and the vibration of the second vibration generator 820 may be different. The first vibration generator 810 may vibrate with the highest period, and the second vibration generator 820 may vibrate with the second highest period.

As described above, the first vibration generator 810 may receive vibration data from the main processor 710 when a force is applied to the first force sensor 510, and the second vibration generator 820 may receive vibration data from the main processor 710 when a force is applied to the second force sensor 520. The vibration data sent to the first vibration generator 810 may be different from the vibration data sent to the second vibration generator 820. That is, the vibration data received by the first vibration generator 810 from the main processor 710 may be different from the vibration data received by the second vibration generator 820 from the main processor 710. The vibration data may have a plurality of parameters. As described above, the vibration data may be a vibration displacement, a frequency, a vibration displacement over time, a waveform, or duration.

From a user's point of view, the user feels different vibrations when a force is applied to a region where the first force sensor 510 is disposed and when a force is applied to a region where the second force sensor 520 is disposed. That is, the user may feel different vibrations when a force is applied to the region where the first force sensor 510 is disposed and when a force is applied to the region where the second force sensor 520 is disposed due to different vibration displacements, frequencies, vibration displacements over time, waveforms or durations. As will be described later, the first force sensor 510 may have a plurality of force sensing cells CE1a through CE8a, and the second force sensor 520 may have a plurality of force sensing cells CE1b through CE8b. Each of the first force sensor 510 and the second force sensor 520 may include a plurality of cell groups formed by a plurality of adjacent force sensing cells CE1 through CE8. For example, the first force sensor 510 may include a volume up button cell group VB+, a volume down button cell group VB−, a power button cell group PWB or a squeeze sensing button cell group SB of the display device 10, and the second force sensor 520 may include a call button cell group CB, a camera button cell group CMB, an Internet button cell group IB or a squeeze sensing button cell group SB.

The first vibration generator 810 generates a vibration when a force is applied to the region of the first force sensor 510 in which the volume up button VB+, the volume down button VB−, the power button PWB or the squeeze sensing button SB of the display device 10 is disposed. The vibration generated by the first vibration generator 810 is different from a vibration generated by the second vibration generator 820. Therefore, a user can distinguish the region where the first force sensor 510 is disposed from the region where the second force sensor 520 is disposed. Further, the user can distinguish cell groups including a plurality of functional buttons of the first force sensor 510 and cell groups including a plurality of functional buttons of the second force sensor 520 based on different vibrations of the first vibration generator 810 and the second vibration generator 820. Therefore, the user can easily identify functions based on different vibrations even if icons representing the functions are not displayed on a display surface.

Each of the first vibration generator 810 and the second vibration generator 820 may also be embodied as a sound generator capable of generating vibration and outputting sound. The first vibration generator 810 and the second vibration generator 820 will be described in detail later with reference to FIGS. 10 through 12.

The middle frame 600 may be disposed below the under-panel member 390. The middle frame 600 may include synthetic resin, metal, or both synthetic resin and metal.

The waterproof member 400 may be disposed at edges of the middle frame 600. The waterproof member 400 may be disposed outside the first force sensor 510 and outside the second force sensor 520. The waterproof member 400 may be attached to an upper surface of the under-panel member 390 and a lower surface of the middle frame 600.

According to the exemplary embodiment illustrated in FIGS. 1 and 2, since the waterproof member 400 is disposed outside the first force sensor 510 and outside the second force sensor 520, penetration of moisture or dust into between the display panel 300 and the middle frame 600 can be prevented. That is, a waterproof and dustproof display device 10 can be provided.

The middle frame 600 includes a first camera hole CMH1 into which a camera device 720 is inserted, a battery hole BH for dissipating the heat of a battery, and a cable hole CAH through which the second connection cable 314 connected to the display circuit board 310 passes. Specifically, the cable hole CAH may be disposed adjacent to a right edge of the middle frame 600. In this case, the cable hole CAH may be hidden by the first force sensor 510 disposed below the under-panel member 390 at the right edge of the display panel 300. Therefore, the first force sensor 510 may include a notch-shaped recess NTH formed at one side so as not to hide the cable hole CAH as illustrated in FIG. 2.

In addition, the middle frame 600 is disposed below the under-panel member 390 of the display panel 300, the first force sensor 510, and the second force sensor 520. The middle frame 600 may support the first force sensor 510 and the second force sensor 520 when a force is applied to the first force sensor 510 and the second force sensor 520. Therefore, the first force sensor 510 and the second force sensor 520 can sense the applied force.

The lower cover 900 may be disposed below the middle frame 600. The lower cover 900 may be fastened and fixed to the middle frame 600. The lower cover 900 may form the lower exterior of the display device 1. The lower cover 900 may include plastic and/or metal. A second camera hole CMH2 may be formed in the lower cover 900 to allow the camera device 720 to be inserted and protrude to the outside. The lower cover 900 may include the third vibration generator 910.

The third vibration generator 910 may be a vibration generator, such as an eccentric rotating mass (ERM) motor, a linear resonant actuator (LRA), or a piezo actuator. The third vibration generator 910 may generate a vibration according to a vibration signal received from the main processor 710. Although the third vibration generator 910 is disposed at an upper edge of the lower cover 900 in FIG. 2, the inventive concepts are not limited to this case.

If vibration generators adjacent to eighth force sensing cells CE8a and CE8b illustrated in FIG. 3 are not disposed below the under-panel member 390, when a force is applied to the eighth force sensing cells CE8a and CE8b, the third vibration generator 910 may generate a vibration according to a vibration signal received from the main processor 710. The vibration of the third vibration generator 910 may be different from those of the first vibration generator 810 and the second vibration generator 820.

Vibration data received by the third vibration generator 910 from the main processor 710 may be different from vibration data received by the first and second vibration generators 810 and 820 from the main processor 710. As described above, the vibration data may be a vibration displacement, a frequency, a vibration displacement over time, a waveform, or duration.

For example, the vibrations of the first and second vibration generators 810 and 820 may have different vibration displacements (or maximum vibration displacements). The vibrations of the first and second vibration generators 810 and 820 may have different frequencies (or periods). The vibrations of the first and second vibration generators 810 and 820 may have different vibration displacements over time. The vibrations of the first and second vibration generators 810 and 820 may have different waveforms. The vibrations of the first and second vibration generators 810 and 820 may have different durations.

The position of the camera device 720 and the positions of the first and second camera holes CMH1 and CMH2 corresponding to the camera device 720 are not limited to the embodiment illustrated in FIGS. 1, 2, 4 and 5.

The main circuit board 700 may be disposed between the middle frame 600 and the lower cover 900. The main circuit board 700 may be a printed circuit board or a flexible printed circuit board.

The main circuit board 700 may include the main processor 710, the camera device 720, and a main connector 730.

The main processor 710 may be disposed on a first surface of the main circuit board 700 which faces the middle frame 600 while the main connector 730 is disposed on a second surface of the main circuit board 700 which faces the lower cover 900. In addition, the camera device 720 may be disposed on both the first and second surfaces of the main circuit board 700. In this case, an upper surface of the camera device 720 may be disposed on the second surface of the main circuit board 700, and a lower surface of the camera device 720 may be disposed on the first surface of the main circuit board 700.

The main processor 710 may control all the functions of the display device 10. For example, the main processor 710 may output image data to the display driving unit 320 of the display circuit board 310 so that the display panel 300 displays an image. In addition, the main processor 710 may receive touch data from the touch driving unit 220, determine a user's touch position, and then execute an application indicated by an icon displayed at the touch position of the user. Also, the main processor 710 may receive force sensing data from the touch driving unit 220 or the display driving unit 320 and output a home screen, control the sound volume of the display device 10 or implement a haptic function according to the force sensing data. Further, the main processor 710 may output vibration data for vibrating the first vibration generator 810 and the second vibration generator 820 to the vibration driving unit 340 and output a vibration signal for vibrating the third vibration generator 910 to the third vibration generator 910.

The main processor 710 may be an application processor, central processing unit, or system chip formed as an integrated circuit.

The camera device 720 processes an image frame such as a still image or a moving image obtained by an image sensor in a camera mode and outputs the processed image frame to the main processor 710.

The second connection cable 314 passing through a cable hole CAH of the middle frame 600 may be connected to the main connector 730 disposed on a lower surface of the main circuit board 700 through a gap between the middle frame 600 and the main circuit board 700. Therefore, the main circuit board 700 may be electrically connected to the display circuit board 310 and the touch circuit board 210.

In addition, the main circuit board 700 may further include a mobile communication module capable of transmitting or receiving a wireless signal to or from at least one of a base station, an external terminal, and a server over a mobile communication network. The wireless signal may include a voice signal, a video call signal, or various types of data according to text/multimedia message transmission/reception. In addition, the main circuit board 700 may further include a sound output device capable of outputting sound and a vibration generator capable of generating vibration for haptic implementation.

Figure 4:
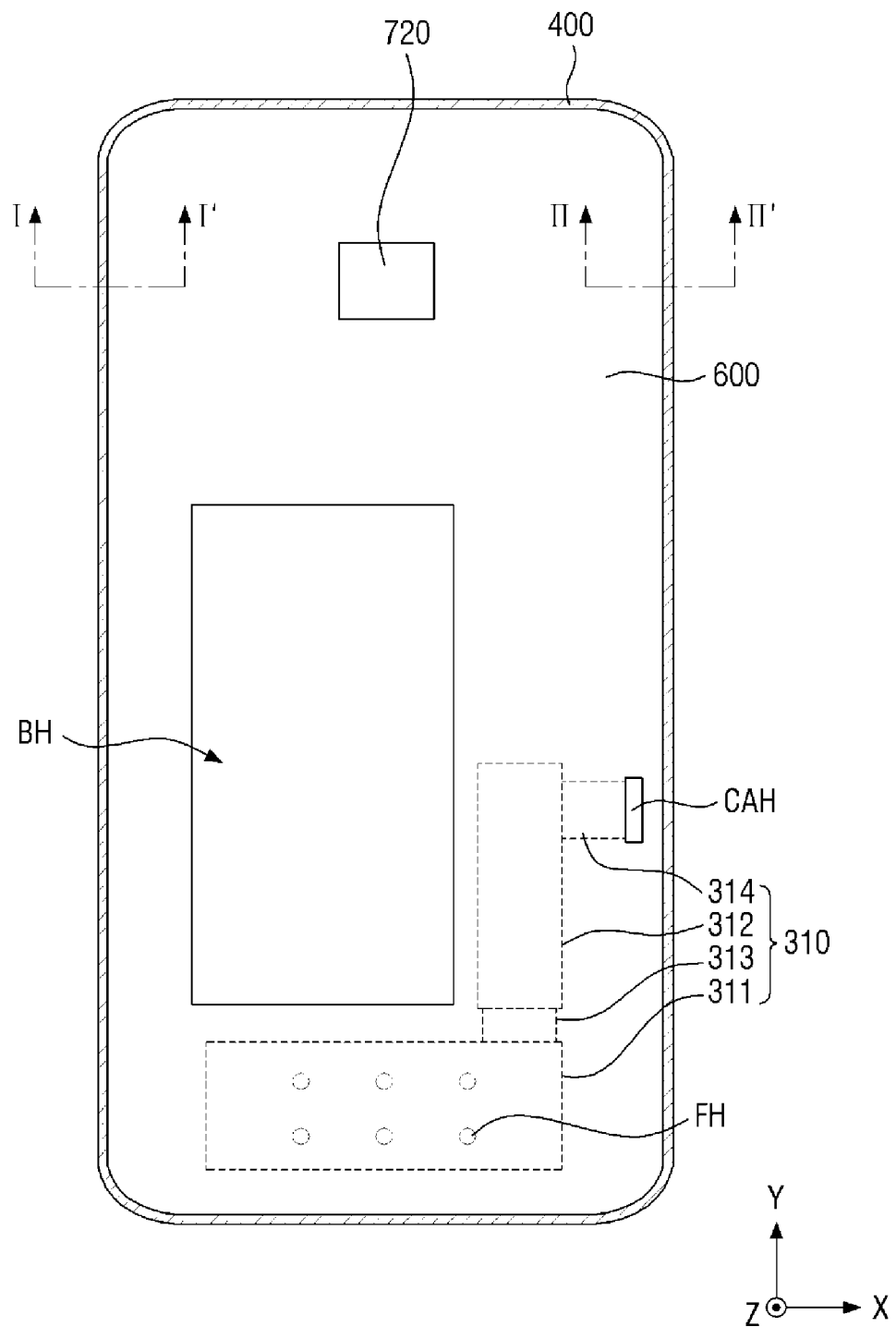
FIG. 4 is a plan view of a middle frame according to an exemplary embodiment.
Figure 5:
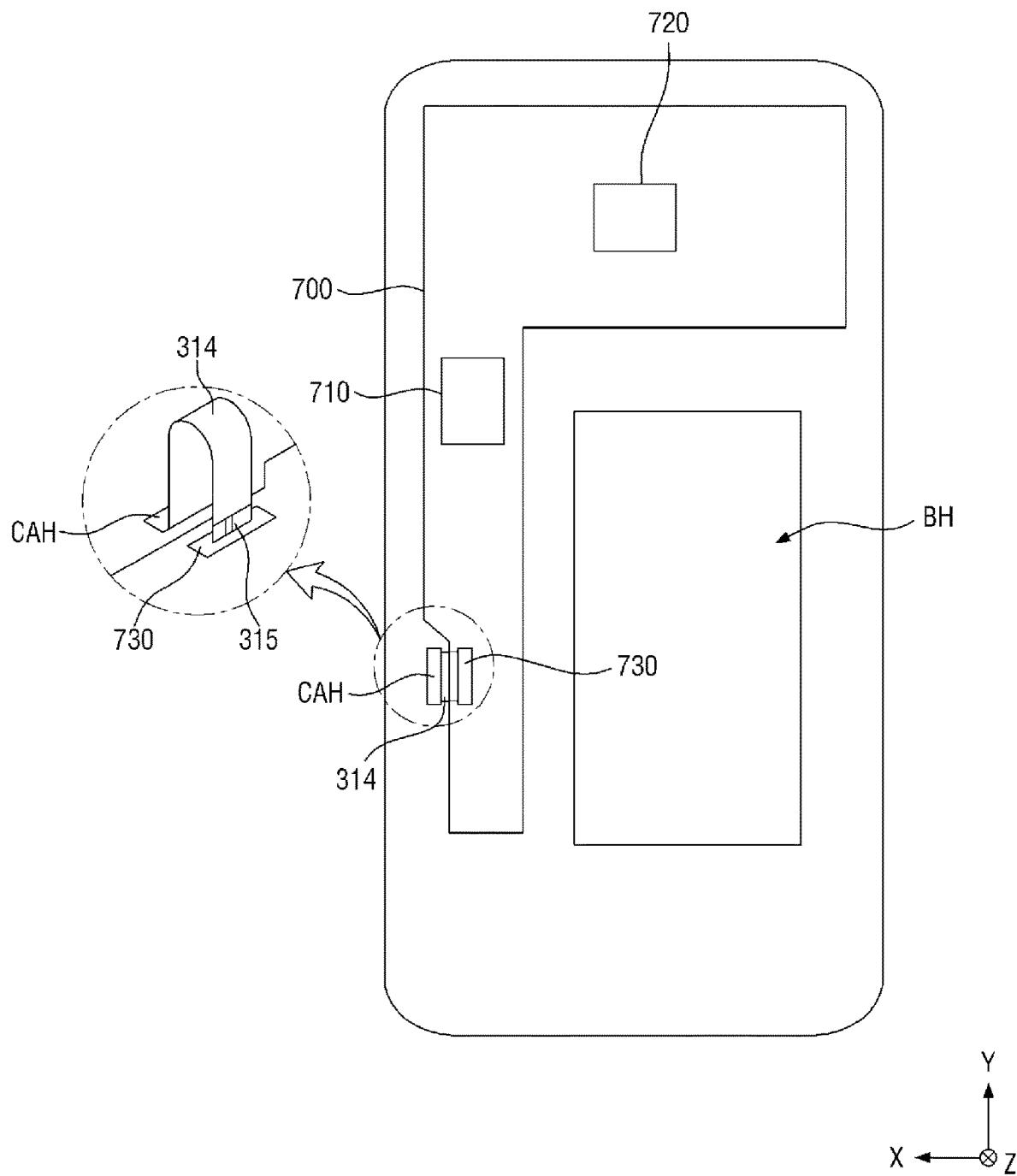
FIG. 5 is a bottom view of the middle frame and a main circuit board according to an exemplary embodiment.

FIG. 4 is a plan view of the middle frame 600 according to an exemplary embodiment. FIG. 5 is a bottom view of the middle frame 600 and the main circuit board 700 according to an exemplary embodiment.

The connection between the display circuit board 310 and the third circuit board 550 and the connection between the second connection cable 314 and the main connector 730 of the main circuit board 700 will now be described in detail with reference to FIGS. 3 through 5. Since FIGS. 3 and 5 are bottom views while FIG. 4 is a plan view, it should be noted that the right and left sides of the display device 10 in FIG. 4 are reversed in FIGS. 3 and 5. For ease of description, the display circuit board 310 is indicated by a dash-dotted line in FIG. 4, and the second connection cable 314 is indicated by a dash-dotted line in FIG. 5.

Referring to FIGS. 3 through 5, the display circuit board 310 may include the first circuit board 311, the second circuit board 312, and the first connection cable 313.

The first circuit board 311 may be attached to a side of the upper or lower surface of the substrate of the display panel 300 and may be bent toward the lower surface of the substrate of the display panel 300. The first circuit board 311 may be fixed to fixing holes FH formed in the middle frame 600 by fixing members as illustrated in FIG. 4.

The first circuit board 311 may include the display driving unit 320, the force sensing unit 330, a first connector 311a, a second connector 311b, and a third connector 311c. The display driving unit 320, the force sensing unit 330, the first connector 311a, the second connector 311b, and the third connector 311c may be disposed on a surface of the first circuit board 311.

The first connector 311a may be connected to an end of the first connection cable 313 connected to the second circuit board 312. Therefore, the display driving unit 320 and the force sensing unit 330 mounted on the first circuit board 311 may be electrically connected to the second circuit board 312 by the first connection cable 313.

The second connector 311b may be connected to an end of the third circuit board 550 connected to the first force sensor 510 and the second force sensor 520. Therefore, the first force sensor 510 and the second force sensor 520 may be electrically connected to the force sensing unit 330.

The third connector 311c may be connected to an end of the fourth circuit board 890 connected to the first vibration generator 810 and the second vibration generator 820. Therefore, each of the first vibration generator 810 and the second vibration generator 820 may be electrically connected to the vibration driving unit 340 of the display circuit board 310. Further, since the display circuit board 310 is electrically connected to the main circuit board 700 by the second connection cable 314, each of the first vibration generator 810 and the second vibration generator 820 may be electrically connected to the main processor 710 of the main circuit board 700.

The second circuit board 312 may include a touch connector 312a, a first connection connector 312b, and a second connection connector 312c. The first connection connector 312b and the second connection connector 312c may be disposed on a surface of the second circuit board 312, and the touch connector 312a may be disposed on the other surface of the second circuit board 312.

The touch connector 312a may be connected to an end of the touch circuit board 210. Therefore, the touch driving unit 220 may be electrically connected to the second circuit board 312.

The first connection connector 312b may be connected to the other end of the first connection cable 313 connected to the first circuit board 311. Therefore, the display driving unit 320 and the force sensing unit 330 mounted on the first circuit board 311 may be electrically connected to the second circuit board 312 by the first connection cable 313.

The second connection connector 312c may be connected to an end of the second connection cable 314 connected to the main connector 730 of the main circuit board 700. Therefore, the second circuit board 312 may be electrically connected to the second circuit board 312 by the second connection cable 314.

A connector connection portion 315 may be formed at the other end of the second connection cable 314. The connector connection portion 315 of the second connection cable 314 may pass through the cable hole CAH of the middle frame 600 and extend to under the middle frame 600, as illustrated in FIGS. 3 and 4. Since the notch-shaped recess NTH is formed on an inner side of the first force sensor 510 in a region corresponding to the cable hole CAH of the middle frame 600, the cable hole CAH of the middle frame 600 may be exposed without being covered by the first force sensor 510.

According to the exemplary embodiment illustrated in FIGS. 3 through 5, the notch-shaped recess NTH is formed on one side of the first force sensor 510 so as not to cover the cable hole CAH of the middle frame 600. Thus, the second connection cable 314 connected to the display circuit board 310 may extend to under the middle frame 600 through the cable hole CAH and may be connected to the main connector 730 of the main circuit board 700. Therefore, the display circuit board 310 and the main circuit board 700 can be stably connected to each other.

Figure 6:
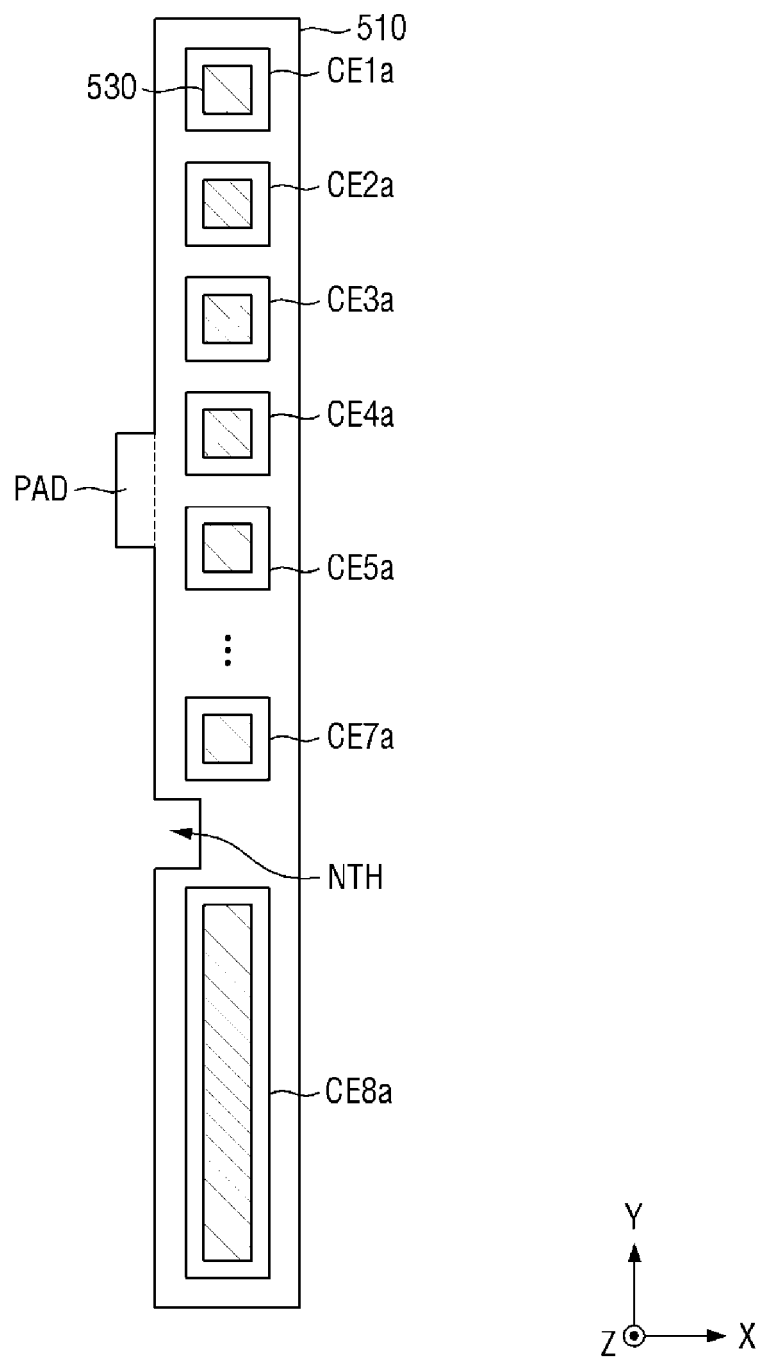
FIG. 6 is a plan view of a first force sensor and first bumps according to an exemplary embodiment.

FIG. 6 is a plan view of the first force sensor 510 and first bumps 530 according to an exemplary embodiment.

Referring to FIG. 6, the first force sensor 510 may have a rectangular planar shape having short sides in the first direction (X-axis direction) and long sides in the second direction (Y-axis direction). However, the planar shape of the first force sensor 510 is not limited to the rectangular shape and may vary depending on the position where the first force sensor 510 is applied.

The first force sensor 510 includes a plurality of force sensing cells CE1a through CE8a. In FIG. 6, the first force sensor 510 includes eight force sensing cells CE1a through CE8a. However, the number of the force sensing cells CE1a through CE8a is not limited to eight.

Each of the force sensing cells CE1a through CE8a may independently sense the force at a corresponding position. In FIG. 6, the force sensing cells CE1a through CE8a are arranged in one column. However, the inventive concepts are not limited to this case. The force sensing cells CE1a through CE8a may also be arranged in a plurality of columns as required. In addition, the force sensing cells CE1a through CE8a may be arranged at predetermined intervals, as illustrated in FIG. 6, or may be arranged continuously.

Figure 14A:
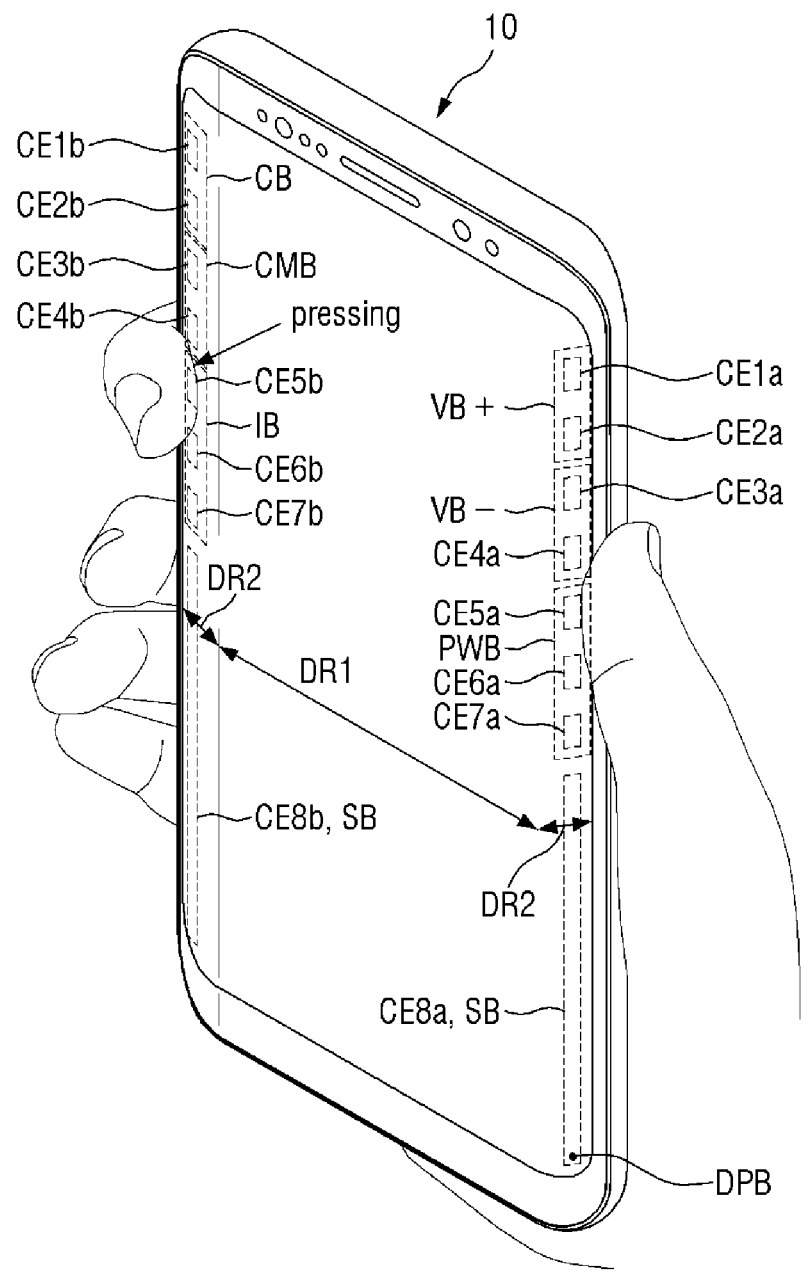
FIG. 14A and FIG. 14B illustrate a display device that utilizes force sensors as physical buttons and generates vibrations locally by connecting vibration generators to the force sensors or a touch sensing device according an exemplary embodiment.
Figure 14B:
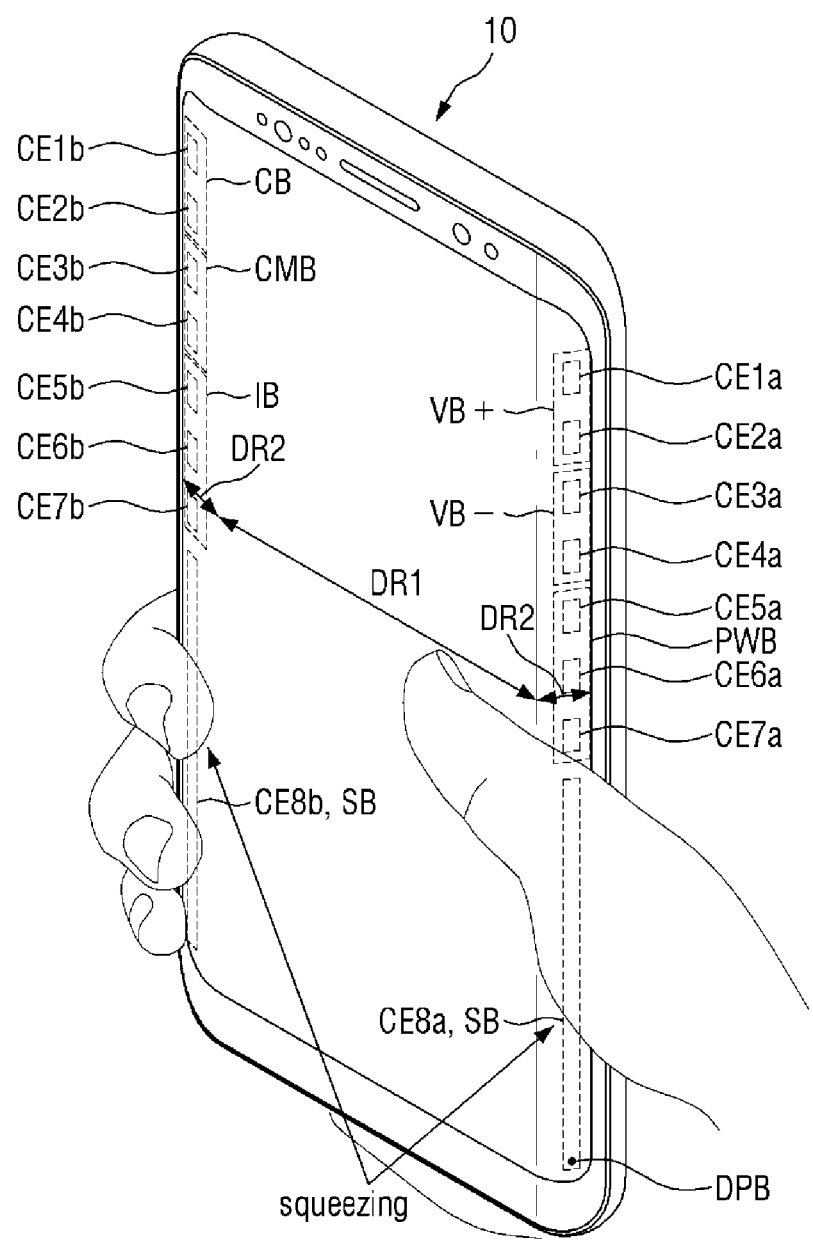

The force sensing cells CE1a through CE8a may have different areas depending on their use. For example, as illustrated in FIG. 14A, the first through seventh force sensing cells CE1a through CE7a may be used as physical buttons, such as the volume control button (VB+ and VB−) or the power button PWB disposed at one edge of the display device 10. Alternatively, as illustrated in FIG. 14B, the eighth force sensing cell CE8a may be used as the button SB for sensing the squeezing force of a user. In this case, the eighth force sensing cell CE8a may be formed to have a wider area than the first through seventh force sensing cells CE1a through CE7a. The eighth force sensing cell CE8a may be longer than the first through seventh force sensing cells CE1a through CE7a in a longitudinal direction (Y-axis direction) of the first force sensor 510.

In addition, although the first through seventh force sensing cells CE1a through CE7a used as physical buttons have the same area in FIG. 6, the inventive concepts are not limited to this case. That is, the areas of the first through seventh force sensing cells CE1a through CE7a may also be different from each other. Alternatively, the areas of some of the first through seventh force sensing cells CE1a through CE7a may be equal to each other, and the areas of the other force sensing cells may be equal to each other. However, the areas of the some of the first through seventh force sensing cells CE1a through CE7a may be different from the areas of the other force sensing cells.

The first bumps 530 may be disposed on the first through eighth force sensing cells CE1a through CE8a to overlap the first through eighth force sensing cells CE1a through CE8a. The first bumps 530 serve to press the first through eighth force sensing cells CE1a through CE8a according to the force applied by a user. Therefore, the force of the user can be sensed by the first through eighth force sensing cells CE1a through CE8a.

In order to increase the force applied to the first through eighth force sensing cells CE1a through CE8a by the first bumps 530, the first bumps 530 may be formed to have smaller areas than the first through eighth force sensing cells CE1a through CE8a, respectively. Each of the first bumps 530 may be formed to have a smaller area than a force sensing layer PSL (FIGS. 8 and 9) of each of the first through eighth force sensing cells CE1a through CE8a.

The area of a first bump 530 may be proportional to the area of a force sensing cell. For example, when the area of the eighth force sensing cell CE8a is larger than the area of each of the first through seventh force sensing cells CE1a through CE7a, as illustrated in FIG. 6, the area of the first bump 530 overlapping the eighth force sensing cell CE8a may be larger than the area of each of the first bumps 530 overlapping the first through seventh force sensing cells CE1a through CE7a.

In addition, in order not to cover the cable hole CAH of the middle frame 600, the notch-shaped recess NTH may be formed in a region of the first force sensor 510 which corresponds to the cable hole CAH of the middle frame 600.

Figure 7:
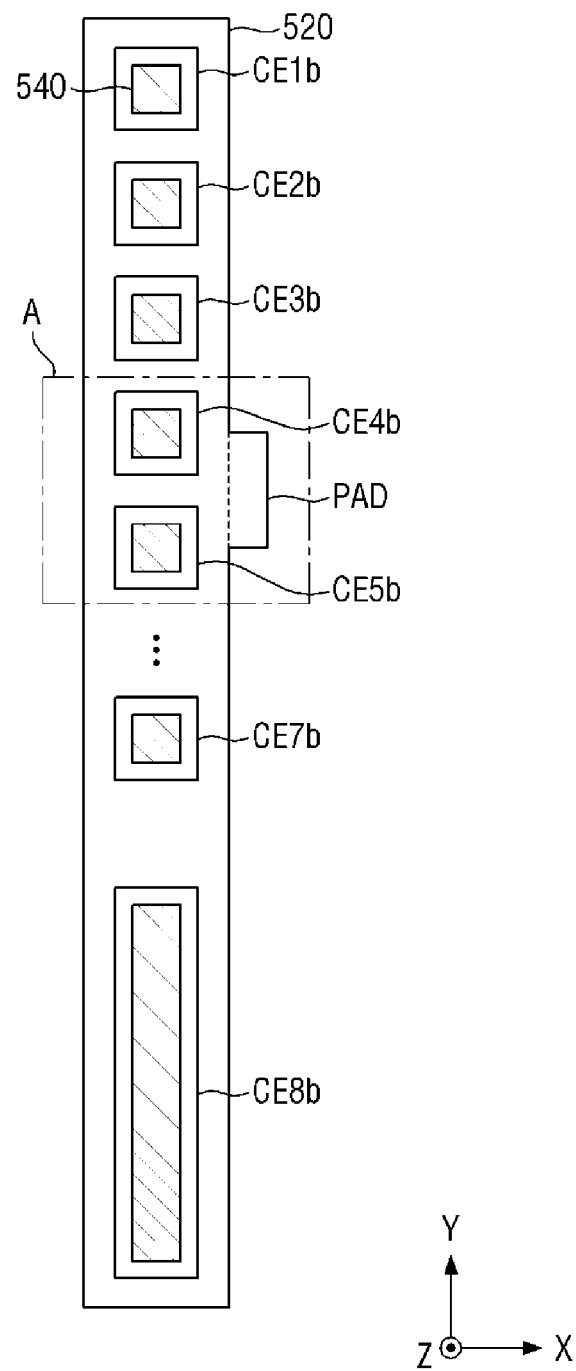
FIG. 7 is a plan view of a second force sensor and second bumps according to an exemplary embodiment.

The only difference between the second force sensor 520 and second bumps 540 illustrated in FIG. 7 and the first force sensor 520 and the first bumps 530 illustrated in FIG. 6 is to that the second force sensor 520 does not include a recess NTH. Thus, a detailed description of the second force sensor 520 and the second bumps 540 illustrated in FIG. 7 will be omitted.

Figure 8:
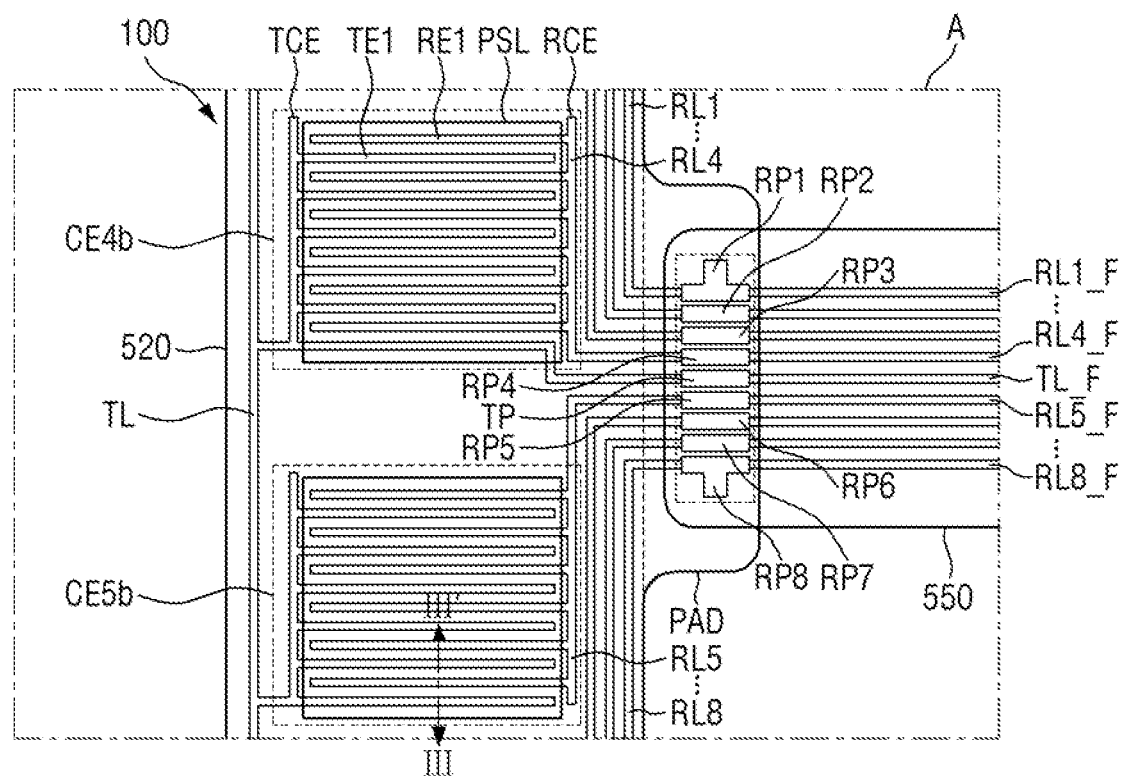
FIG. 8 is a plan view illustrating an area A of FIG. 7 in detail.
Figure 9:
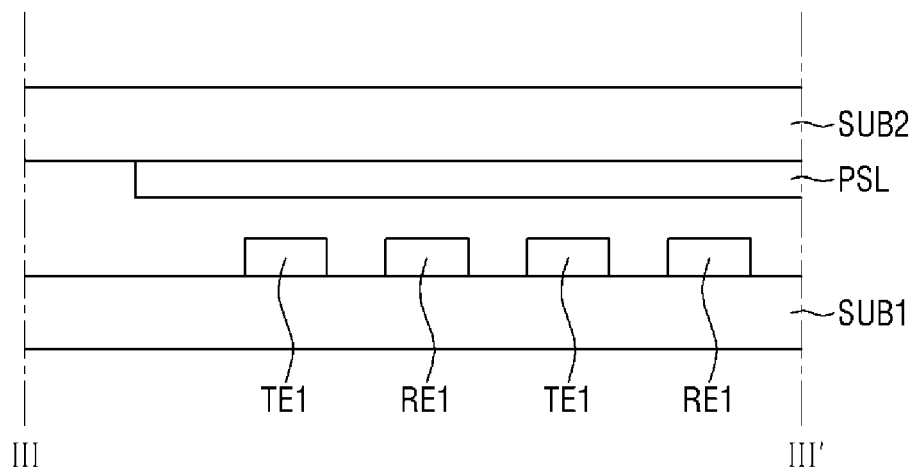
FIG. 9 is a cross-sectional view illustrating an example of III-III' of FIG. 8.
Figure 9:
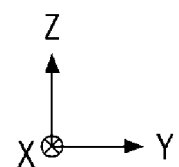

FIG. 8 is a plan view illustrating an area A of FIG. 7 in detail. FIG. 9 is a cross-sectional view illustrating an example of III-III' of FIG. 8.

Referring to FIGS. 8 and 9, the second force sensor 520 includes a first substrate SUB1, a second substrate SUB2, a driving line TL, first through eighth sensing lines RL1 through RL8 (where p is an integer of 2 or more), a driving pad TP, first through eighth sensing pads RP1 through RP8, and first through eighth force sensing cells CE1b through CE8b.

In FIG. 8, only the fourth force sensing cell CE4b, the fifth force sensing cell CE5b, and a pad region PAD are illustrated for ease of description. In addition, in FIG. 8, the second substrate SUB2 is omitted for ease of description.

The first substrate SUB1 and the second substrate SUB2 are placed to face each other. Each of the first and second substrates SUB1 and SUB2 may include a polyethylene, polyimide, polycarbonate, polysulfone, polyacrylate, polystyrene, polyvinyl chloride, polyvinyl alcohol, polynorbornene, or polyester-based material. In an exemplary embodiment, each of the first substrate SUB1 and the second substrate SUB2 may be made of a polyethylene terephthalate (PET) film or a polyimide film.

The force sensing cells CE1 through CE8 (CE1b through CE8b) are disposed between the first substrate SUB1 and the second substrate SUB2. The driving line TL, the sensing lines RL1 through RL8, the driving pad TP and the sensing pads RP1 through RP8 are disposed on a surface of the first substrate SUB1, which faces the second substrate SUB2. The force sensing cells CE1b through CE8b are disposed between the first substrate SUB1 and the second substrate SUB2.

Each of the force sensing cells CE1b through CE8b may be connected to at least one driving line and at least one sensing line. For example, while the force sensing cells CE1b through CE8b are commonly connected to one driving line TL, they may be connected one-to-one to the sensing lines RL1 through RL8. As illustrated in FIG. 8, the fourth force sensing cell CE4b may be connected to the driving line TL and the fourth sensing line RL4, and the fifth force sensing cell CE5 may be connected to the driving line TL and the fifth sensing line RL5.

The driving line TL may be connected to the driving pad TP, and the sensing lines RL1 through RL8 may be connected one-to-one to the sensing pads RP1 through RP8. The first sensing line RL1 may be connected to the first sensing pad RP1, the second sensing line RL2 may be connected to the second sensing pad RP2, the third sensing line RL3 may be connected to the third sensing pad RP3, and the fourth sensing line RL4 may be connected to the fourth sensing pad RP4. The fifth sensing line RL5 may be connected to the fifth sensing pad RP5, the sixth sensing line RL6 may be connected to the sixth sensing pad RP6, the seventh sensing line RL7 may be connected to the seventh sensing pad RP7, and the eighth sensing line RL8 may be connected to the eighth sensing pad RP8.

The pad region PAD may protrude from a side of the first substrate SUB1. The side of the first substrate SUB1 may be a long side of the second force sensor 520. In FIG. 8, the pad region PAD protrudes from the middle of the long side of the first substrate SUB1. However, the present disclosure is not limited to this case. That is, the first substrate SUB1 may also protrude from one end or the other end of the long side of the first substrate SUB1.

The driving pad TP and the sensing pads RP1 through RP8 may be disposed in the pad region PAD. The driving pad TP and the sensing pads RP1 through RP8 may be connected one-to-one to a driving lead line TL_F and sensing lead lines RL1_F through RL8_F of the third circuit board 550 by an anisotropic conductive film. The driving pad TP may be connected to the driving lead line TL_F, the first sensing pad RP1 may be connected to the first sensing lead line RL1_F, the second sensing pad RP2 may be connected to the second sensing lead line RL2_F, the third sensing pad RP3 may be connected to the third sensing lead line RL3_F, and the fourth sensing pad RP4 may be connected to the fourth sensing lead line RL4_F. In addition, the fifth sensing pad RP5 may be connected to the fifth sensing lead line RL5_F, the sixth sensing pad RP6 may be connected to the sixth sensing lead line RL6_F, the seventh sensing pad RP7 may be connected to the seventh sensing lead line RL7_F, and the eighth sensing pad RP8 may be connected to the eighth sensing lead line RL8_F.

Since the third circuit board 550 is connected to the display circuit board 310 as illustrated in FIG. 8, it may be electrically connected to the force sensing unit 330 mounted on the display circuit board 310. The force sensing unit 330 may apply a driving voltage to the driving line TL through the driving lead line TL_F of the third circuit board 550 and the driving pad TP of the first force sensor 510 and sense current values or voltage values from the sensing lines RL1 through RL8 through the sensing lead lines RL1_F through RL8_F connected to the sensing pads RP1 through RP8 of the second force sensor 520, thereby sensing the force applied to the force sensing cells CE1*a* through CE8*a*.

The second force sensor 520 may further include a bonding layer disposed between the first substrate SUB1 and the second substrate SUB2 to bond the first substrate SUB1 and the second substrate SUB2. The bonding layer may be a force-sensitive adhesive layer or an adhesive layer. The bonding layer may be disposed along the periphery of the first substrate SUB1 and the second substrate SUB2. In an exemplary embodiment, the bonding layer may completely surround the edges of the first substrate SUB1 and the second substrate SUB2 to seal the inside of the second force sensor 520. In addition, the bonding layer may serve as a spacer for maintaining a constant gap between the first substrate SUB1 and the second substrate SUB2.

The bonding layer may not overlap the driving line TL, the sensing lines RL1 through RL8, the force sensing cells CE1*b* through CE8*b*, the driving pad TP, and the sensing pads RP1 through RP8.

The bonding layer may be attached to a surface of one of the first substrate SUB1 and the second substrate SUB2 and then be attached to a surface of the other substrate in the process of bonding the first substrate SUB1 and the second substrate SUB2 together. Alternatively, the bonding layer may be provided on a surface of each of the first substrate SUB1 and the second substrate SUB2, and the bonding layer of the first substrate SUB1 and the bonding layer of the second substrate SUB2 may be attached to each other in the process of bonding the first substrate SUB1 and the second substrate SUB2 together.

Each of the force sensing cells CE1*b* through CE8*b* includes a driving connection electrode TCE, a sensing connection electrode RCE, driving electrodes TE1, sensing electrodes RE1, and a force sensing layer PSL, as illustrated in FIGS. 8 and 9.

The driving connection electrode TCE, the sensing connection electrode RCE, the driving electrodes TE1 and the sensing electrodes RE1 are disposed on the first substrate SUB1 facing the second substrate SUB2.

The driving connection electrode TCE is connected to the driving line TL and the driving electrodes TE1. Specifically, an end of the driving connection electrode TCE in the longitudinal direction (Y-axis direction) is connected to the driving line TL. The driving electrodes TE1 may branch from the driving connection electrode TCE in a width direction (X-axis direction) of the driving connection electrode TCE.

The sensing connection electrode RCE is connected to any one of the sensing lines RL1 through RL8 and the sensing electrodes RE1. Specifically, an end of the sensing connection electrode TCE in the longitudinal direction (Y-axis direction) is connected to any one of the sensing lines RL1 through RL8. The sensing electrodes RE1 may branch from the sensing connection electrode RCE in the width direction (X-axis direction) of the sensing connection electrode RCE.

The driving electrodes TE1 and the sensing electrodes RE1 may be disposed on the same layer. The driving electrodes TE1 and the sensing electrodes RE1 may be made of the same material. For example, the driving electrodes TE1 and the sensing electrodes RE1 may include a conductive material such as silver (Ag) or copper (Cu). The driving electrodes TE1 and the sensing electrodes RE1 may be formed on the first substrate SUB1 by a screen printing method.

The driving electrodes TE1 and the sensing electrodes RE1 are disposed adjacent to each other but are not connected to each other. The driving electrodes TE1 and the sensing electrodes RE1 may be arranged parallel to each other. The driving electrodes TE1 and the sensing electrodes RE1 may be alternately arranged in the longitudinal direction (Y-axis direction) of the driving connection electrode TCE and the sensing connection electrode RCE. That is, the driving electrodes TE1 and the sensing electrodes RE1 may be repeatedly arranged in the order of the driving electrode TE1, the sensing electrode RE1, the driving electrode TE1 and the sensing electrode RE1 in the longitudinal direction (Y-axis direction) of the driving connection electrode TCE and the sensing connection electrode RCE.

The force sensing layer PSL is disposed on a surface of the second substrate SUB2 which faces the first substrate SUB1. The force sensing layer PSL may be disposed to overlap the driving electrodes TE1 and the sensing electrodes RE1.

The force sensing layer PSL may include a force sensitive material and a polymer resin in which the force sensitive material is disposed. The force sensitive material may be metal fine particles (or metal nanoparticles) such as nickel, aluminum, titanium, tin, or copper. For example, the force sensing layer PSL may be a quantum tunneling composite (QTC).

When no force is applied to the second substrate SUB2 in a height direction (Z-axis direction) of the second force sensor 520, a gap exists between the force sensing layer PSL and the driving electrodes TE1 and between the force sensing layer PSL and the sensing electrodes RE1, as illustrated in FIG. 9. That is, when no force is applied to the second substrate SUB2, the force sensing layer PSL is separated from the driving electrodes TE1 and the sensing electrodes RE1.

When a force is applied to the second substrate SUB2 in the height direction (Z-axis direction) of the second force sensor 520, the force sensing layer PSL may contact the driving electrodes TE1 and the sensing electrodes RE1. In this case, at least one of the driving electrodes TE1 and at least one of the sensing electrodes RE1 may be physically connected by the force sensing layer PSL, and the force sensing layer PSL may act as an electrical resistor.

Therefore, according to the exemplary embodiment illustrated in FIGS. 8 and 9, since the contact area between the force sensing layer PSL and the driving electrodes TE1 and the sensing electrodes RE1 in the second force sensor 520 varies according to the applied force, a resistance value of a sensing line electrically connected to the sensing electrodes RE1 may vary. The force sensing unit 330 may sense changes in the current values or voltage values from the sensing lines RL1 through RL8, thereby sensing the force with which the user presses by hand.

The first force sensor 510 is substantially the same as the second force sensor 520 illustrated in FIGS. 8 and 9 except that it includes the force sensing cells CE1a through CE8a. Thus, a detailed description of the first force sensor 510 will be omitted.

Figure 10:
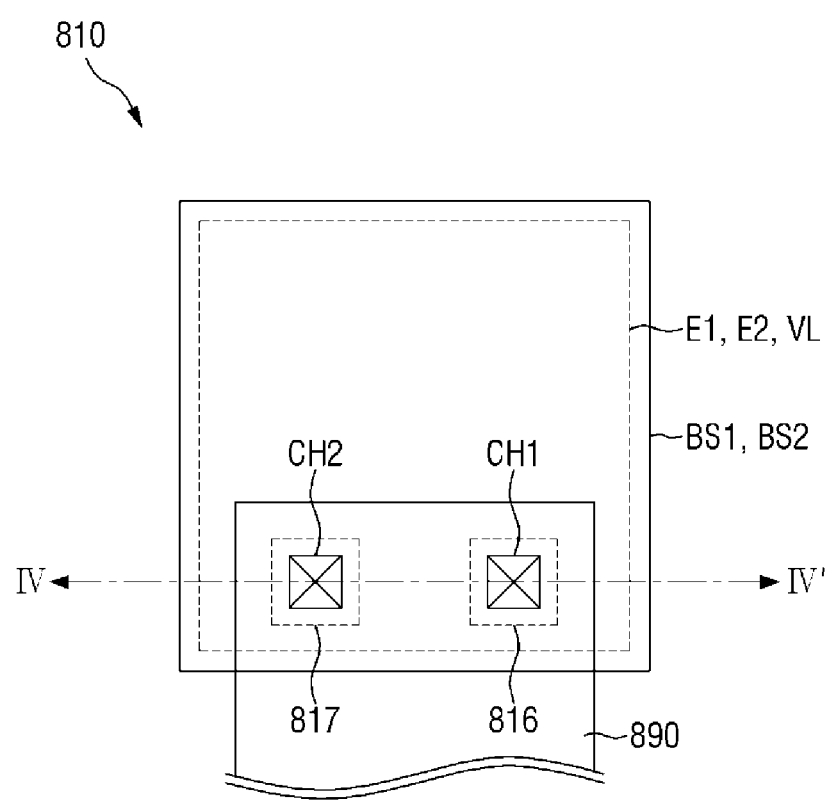
FIG. 10 is a plan view of a first vibration generator.
Figure 11:
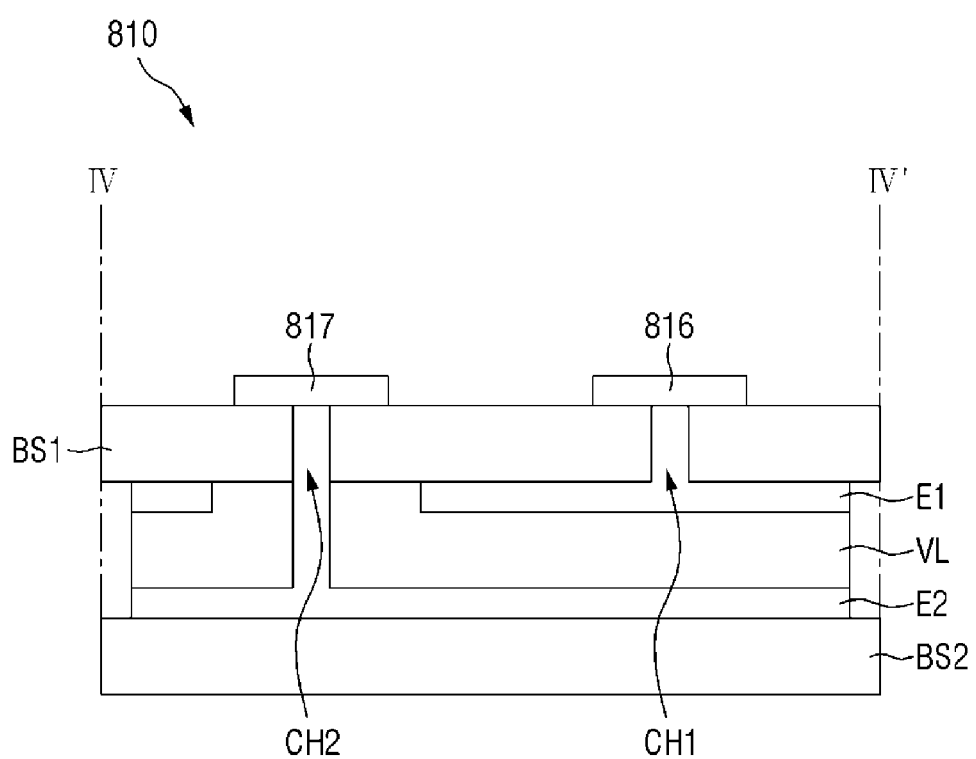
FIG. 11 is a cross-sectional view illustrating an example of IV-IV' of FIG. 10.

FIG. 10 is a plan view of the first vibration generator 810. FIG. 11 is a cross-sectional view illustrating an example of IV-IV' of FIG. 10.

Referring to FIGS. 10 and 11, the first vibration generator 810 may include a first electrode E1, a second electrode E2, a vibration layer VL, a first base substrate BS1, a second base substrate BS2, a first pad electrode 816, and a second pad electrode 817.

The first electrode E1 may be disposed on a first surface of the first base substrate BS1, and the vibration layer VL may be disposed on the first electrode E1. The second electrode E2 may be disposed on the vibration layer VL, and the second base substrate BS2 may be disposed on the second electrode E2. The first pad electrode 816 and the second pad electrode 817 may be disposed on a second surface of the first base substrate BS1.

The first electrode E1 and the second electrode E2 may be made of a conductive material. For example, the conductive material may be a transparent conductive material such as indium tin oxide (ITO) or indium zinc oxide (IZO), an opaque metal material, a conductive polymer, or carbon nanotubes (CNTs).

The first electrode E1 may be connected to the first pad electrode 816 via a first contact hole CH1 passing through the first base substrate BS1 and thus may be connected to the fourth circuit board 890 via the first pad electrode 816. In addition, the second electrode E2 may be connected to the second pad electrode 817 via a second contact hole CH2 passing through the vibration layer VL and the first base substrate BS1 and thus, may be connected to the fourth circuit board 890 via the second pad electrode 817. Ultimately, the first electrode E1 and the second electrode E2 may be electrically connected to the vibration driving unit 340 of the display circuit board 310 by the fourth circuit board 890 and thus, may receive a first driving voltage and a second driving voltage from the vibration driving unit 340.

Figure 12:
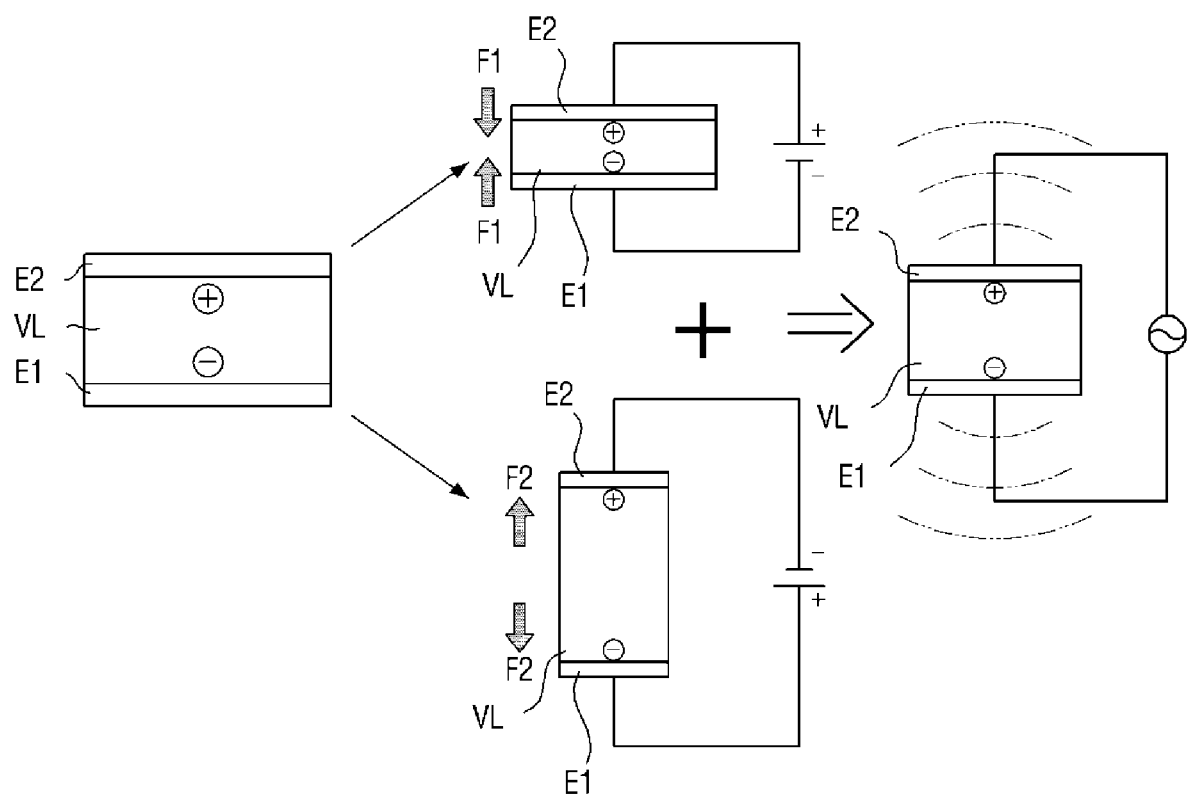
FIG. 12 illustrates an example of the vibration of the first vibration generator.

The vibration layer VL may be a piezo actuator that is deformed as illustrated in FIG. 12 according to the difference between a voltage applied to the first electrode E1 and a voltage applied to the second electrode E2. In this case, the vibration layer VL may be at least any one of a piezoelectric material, such as a polyvinylidene fluoride (PVDF) film or plumbum ziconate titanate (PZT), and an electroactive polymer.

In this case, the vibration layer VL may contract according to a first force F1 applied by the difference between the first driving voltage applied to the first electrode E1 and the second driving voltage applied to the second electrode E2 or may relax or expand according to a second force F2. Specifically, as illustrated in FIG. 12, if the vibration layer VL adjacent to the first electrode E1 has a positive polarity and the vibration layer VL adjacent to the second electrode E2 has a negative polarity, when the first driving voltage having the positive polarity is applied to the first electrode E1 and the second driving voltage having the negative polarity is applied to the second electrode E2, the vibration layer VL may contract according to the first force F1. In addition, if the vibration layer VL adjacent to the first electrode E1 has the positive polarity and the vibration layer VL adjacent to the second electrode E2 has the negative polarity, when the first driving voltage having the negative polarity is applied to the first electrode E1 and the second driving voltage having the positive polarity is applied to the second electrode E2, the vibration layer VL may contract according to the second force F2. If the first driving voltage applied to the first electrode E1 and the second driving voltage applied to the second electrode E2 repeatedly alternate between the positive polarity and the negative polarity, the vibration layer VL may repeatedly contact and relax, thus causing the first vibration generator 810 to vibrate.

In addition, the first vibration generator 810 may output a first sound by vibrating the display panel 300. In this case, since the display device 10 can output sound using a sound generator not exposed to the outside, a sound generator disposed on a front surface of the display device 10 can be removed. Thus, the transmissive portion DA100 of the cover window 100 can be widened. That is, the display area of the display device 10 can be widened.

The first base substrate BS1 and the second base substrate BS2 may be made of an insulating material. For example, the first base substrate BS1 and the second base substrate BS2 may be polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (PI), polycarbonate (PC), cellulose triacetate (CAT), cellulose acetate propionate (CAP), or a combination of these materials. For example, the first base substrate BS1 and the second base substrate BS2 may be made of plastic.

The first pad electrode 816 and the second pad electrode 817 may be made of a conductive material. The first pad electrode 816 and the second pad electrode 817 may be connected to the fourth circuit board 890 using an anisotropic conductive film.

Each of the second vibration generator 820 and the third vibration generator 830 is substantially the same as the first vibration generator 810 described above with reference to FIGS. 10 through 12, and thus its detailed description will be omitted.

According to the exemplary embodiment illustrated in FIGS. 10 through 12, the first vibration generator 810 and the second vibration generator 820 are attached to the lower surface of the under-panel member 390 and are connected to the display circuit board 310 by the fourth circuit board 890.

FIG. 13 is a cross-sectional view illustrating an example of I-I' and II-II' of FIGS. 3 and 4.

The first force sensor 510 may be disposed in the second area DR2 corresponding to a curved portion of the display device 10. The first bumps 530 are disposed on the first force sensor 510. Each of the first bumps 530 may be attached to the lower surface of the under-panel member 390 by a fourth adhesive member 940 and may be attached to an upper surface of the first force sensor 510 by a sixth adhesive member 960.

In addition, the first force sensor 510 may be attached to an upper surface of the middle frame 600 by a fifth adhesive member 950. Each of the fourth adhesive member 940, the fifth adhesive member 950, and the sixth adhesive member 960 may be a pressure sensitive adhesive (PSA). Any one of the fourth adhesive member 940 and the fifth adhesive member 950 can be omitted.

The waterproof member 400 may be disposed outside the first force sensor 510. That is, the waterproof member 400 may be disposed on a side surface of the first force sensor 510, and the side surface of the first force sensor 510 may be disposed closer to an edge of the display panel 300 than the other side surfaces. For example, when the first force sensor 510 is disposed at the right edge of the display panel 300 as illustrated in FIG. 12, the waterproof member 400 may be disposed on a right side surface of the first force sensor 510.

The waterproof member 400 may be attached to the lower surface of the under-panel member 390 and the upper surface of the middle frame 600. To this end, the waterproof member 400 may include a base film, a first adhesive layer disposed on a surface of the base film, and a second adhesive layer disposed on the other surface of the base film.

The base film may be polyethylene terephthalate (PET), polyethylene terephthalate (PET) and a cushion layer, or polyethylene foam (PE-foam). Each of the first adhesive layer and the second adhesive layer may be a PSA. The first adhesive layer may adhere to the lower surface of the under-panel member 390, and the second adhesive layer may adhere to the upper surface of the middle frame 600.

The waterproof member 400 is pressed and attached onto the lower surface of the under-panel member 390 and the upper surface of the middle frame 600. If a height of the waterproof member 400 is less than the sum of a height of the first force sensor 510 and a height of the first bumps 530, the first force sensor 510 may be damaged by the force for attaching the waterproof member 400. Therefore, the height of the waterproof member 400 may be greater than the sum of the height of the first force sensor 510 and the height of the first bumps 530. However, if the height of the waterproof member 400 is much greater than the sum of the height of the first force sensor 510 and the height of the first bumps 530, a force may not be sensed by the first force sensor 510. Therefore, the height of the waterproof member 400 may be experimentally determined in advance in consideration of whether the first force sensor 510 is damaged by the force for attaching the waterproof member 400 and whether a force can be sensed by the first force sensor 510 after the attachment of the waterproof member 400.

In addition, in order for the first bumps 530 to press the force sensing cells CE1a through CE8a of the first force sensor 510 according to the force applied by a user, the height of the first bumps 530 may be greater than the height of the first force sensor 510.

In addition, a width of the waterproof member 400 may be at least 1 mm in order to prevent penetration of water and dust.

According to the exemplary embodiment illustrated in FIG. 13, the waterproof member 400 is disposed outside the first force sensor 510 and attached to the lower surface of the under-panel member 390 and the upper surface of the middle frame 600. Therefore, the waterproof member 400 can prevent moisture and dust from penetrating into between the display panel 300 and the middle frame 600. That is, a waterproof and dustproof display device 10 can be provided.

Since the second force sensor 520 is disposed at the left edge of the display panel 300, the waterproof member 400 may be disposed on a left side surface of the second force sensor 520. Except for this difference, the positions of the waterproof member 400 and the second force sensor 520 are the same as those of the waterproof member 400 and the first force sensor 510, and thus, their detailed description will be omitted.

FIGS. 14A and 14B illustrate a display device that utilizes force sensors as physical buttons and generates vibrations locally by connecting vibration generators to the force sensors or a touch sensing device according to an exemplary embodiment.

In FIGS. 14A and 14B, the first through eighth force sensing cells CE1a through CE8a of the first force sensor 510 and the first through eighth force sensing cells CE1b through CE8b of the second force sensor 520 disposed in the second areas DR2 of the display device 10 are illustrated.

The first vibration generator 810 may be disposed adjacent to the first through eighth force sensing cells CE1a through CE8a of the first force sensor 510 disposed in a right curved portion of the display device 10, and the second vibration generator 820 may be disposed adjacent to the first through eighth force sensing cells CE1b through CE8b.

The first vibration generator 810 may vibrate differently when a force is applied to any one of the force sensing cells CE1a through CE8a of the first force sensor 510 and when a force is applied to another one of the force sensing cells CE1a through CE8a.

The second vibration generator 820 may vibrate differently when a force is applied to any one of the force sensing cells CE1b through CE8b of the second force sensor 520 and when a force is applied to another one of the force sensing cells CE1b through CE8b.

FIG. 14A illustrates a user pressing the fifth force sensing cell CE5b of a left curved portion corresponding to a second area DR2 of the display device 10 with an index finger while holding the display device 10 by hand. FIG. 14B illustrates the user squeezing the eighth force sensing cell CE8b of the left curved portion corresponding to the second area DR2 of the display device 10 with a middle finger, a ring finger and a little finger while holding the display device 10 by hand, and squeezing the eighth force sensing cell CE8a of the right curved portion corresponding to a second area DR2 of the display device 10 with the palm of the hand.

Referring to FIGS. 3, 14A, and 14B, the first force sensor 510 and the second force sensor 520 may be used as physical buttons of the display device 10. Specifically, when a force is applied to the first through eighth force sensing cells CE1a through CE8a of the first force sensor 510 formed in the right curved portion of the display device 10 and the first through eighth force sensing cells CE1b through CE8b of the second force sensor 520 formed in the left curved portion of the display device 10, predetermined applications or operations may be executed.

In addition, when a force is applied to the first force sensor 510, the first vibration generator 810 adjacent to the first force sensor 510 may vibrate. When a force is applied to the second force sensor 520, the second vibration generator 820 adjacent to the second force sensor 520 may vibrate. Alternatively, a vibration generator closest to a touch position of a user may vibrate.

Each of the first force sensor 510 and the second force sensor 520 may have a plurality of cell groups. Each of the cell groups may be formed by adjacent force sensing cells CE. For example, the first force sensing cell CE1$a$ and the second force sensing cell CE2$a$ among the first through eighth force sensing cells CE1$a$ through CE8$a$ of the first force sensor 510 formed in the right curved portion of the display device 10 may be utilized as the volume up button VB+ that a user presses to increase the volume of the display device 10. That is, the first force sensing cell CE1$a$ and the second force sensing cell CE2$a$ may form one cell group.

The third force sensing cell CE3$a$ and the fourth force sensing cell CE4$a$ may be utilized as the volume down button VB− that the user presses to reduce the volume of the display device 10. That is, the third force sensing cell CE3$a$ and the fourth force sensing cell CE4$a$ may form one cell group.

The fifth force sensing cell CE5$a$, the sixth force sensing cell CE6$a$, and the seventh force sensing cell CE7$a$ may be utilized as the power button PWB that the user presses to turn off the power. That is, the fifth force sensing cell CE5$a$, the sixth force sensing cell CE6$a$, and the seventh force sensing cell CE7$a$ may form one cell group.

When a force is sensed from the first force sensing cell CE a and the second force sensing cell CE2$a$ formed in the right curved portion of the display device 10, the main processor 710 may control the volume of the speaker of the display device 10 to be increased. In addition, when a force is sensed from the third force sensing cell CE3$a$ and the fourth force sensing cell CE4$a$ formed in the right curved portion of the display device 10, the main processor 710 may control the volume of the speaker of the display device 10 to be reduced.

In addition, when a force is sensed from the fifth force sensing cell CE5$a$, the sixth force sensing cell CE6$a$ and the seventh force sensing cell CE7$a$ formed in the right curved portion of the display device 10, the main processor 710 may turn off the screen of the display device 10 or output a screen for selecting whether to turn off the power of the display device 10.

In addition, the eighth force sensing cell CE8$a$ formed in the right curved portion of the display device 10 may be utilized as the squeeze sensing button SB. The squeezing force applied to the eighth force sensing cell CE8$a$ may be higher and greater than the force applied to the first through seventh force sensing cells CE1$a$ through CE7$a$. The main processor 710 may control a predetermined application or operation to be executed when a squeezing force is sensed from the eighth force sensing cell CE8$a$ formed in the right curved portion.

The main processor 710 may output vibration data to the second vibration generator 820 so that the second vibration generator 820 adjacent to the first through eighth force sensing cells CE1$b$ through CE8$b$ formed in the left curved portion of the display device 10 vibrates.

When a squeezing force is sensed from the eighth force sensing cell CE8$b$ formed in the left curved portion, the main processor 710 may control the display device 10 to be turned on in a sleep mode. In this case, the main processor 710 may output vibration data to the second vibration generator 820 so that the second vibration generator 820 adjacent to the eighth force detecting cell CE8$b$ formed in the left curved surface portion vibrates.

In addition, the first force sensing cell CE1$b$ and the second force sensing cell CE2$b$ among the first through eighth force sensing cells CE1$b$ to CE8$b$ formed in the left curved portion of the display device 10 may be utilized as the call button CB that the user presses to execute a call application. That is, the first force sensing cell CE1$b$ and the second force sensing cell CE2$b$ may form one cell group.

The third force sensing cell CE3$b$ and the fourth force sensing cell CE4$b$ may be utilized as the camera button CMB that the user presses to execute a camera application. That is, the third force sensing cell CE3$b$ and the fourth force sensing cell CE4$b$ may form one cell group.

The fifth force sensing cell CE5$b$, the sixth force sensing cell CE6$b$, and the seventh force sensing cell CE7$b$ may be utilized as the Internet button IB that the user presses to execute an Internet application. That is, the fifth force sensing cell CE5$b$, the sixth force sensing cell CE6$b$, and the seventh force sensing cell CE7$b$ may form one cell group.

In this case, when a force is sensed from the first force sensing cell CE1$b$ and the second force sensing cell CE2$b$ formed in the left curved portion of the display device 10, the main processor 710 may control the call application to be executed. In addition, when a force is sensed from the third force sensing cell CE3$b$ and the fourth force sensing cell CE4$b$ formed in the left curved portion of the display device 10, the main processor 710 may control the camera application to be executed.

In addition, when a force is sensed from the fifth force sensing cell CE5$b$, the sixth force sensing cell CE6$b$ and the seventh force sensing cell CE7$b$ formed in the left curved portion of the display device 10, the main processor 710 may control the Internet application to be executed.

In addition, the eighth force sensing cell CE8$b$ formed in the left curved portion of the display device 10 may be utilized as the squeeze sensing button SB. The squeezing force applied to the eighth force sensing cell CE8$b$ may be higher and greater than the force applied to the first through seventh force sensing cells CE1$b$ through CE7$b$. When a squeezing force is sensed from the eighth force sensing cell CE8$b$ formed in the left curved portion, the main processor 710 may control a predetermined application or operation to be executed. A screen display button DPB may further be disposed in regions overlapping the eighth force sensing cells CE8$a$ and CE8$b$ of the first force sensor 510 and the second force sensor 520. When a user touches the regions (i.e., the screen display button DPB) overlapping the eighth force sensing cells CE8$a$ and CE8$b$ twice, the main processor 710 may control icons of the first force sensor 510 and the second force sensor 520 to be always displayed. When the user touches the regions overlapping the eighth force sensing cells CE8$a$ and CE8$b$ twice again, the main processor 710 may control the icons of the first force sensor 510 and the second force sensor 520 to be always hidden. While the screen display button DPB is disposed in the regions overlapping the eighth force sensing cells CE8$a$ and CE8$b$ in FIGS. 14A and 14B, the present disclosure is not limited to this case. The screen display button DPB may also be disposed between the eighth force sensing cells CE8$a$ and CE8$b$ or may be disposed on other force sensing cells CE1 through CE7 or between the force sensing cells CE1 through CE7.

The main processor 710 may output vibration data to the second vibration generator 820 so that the second vibration generator 820 adjacent to the first through eighth force sensing cells CE1b through CE8b formed in the left curved portion of the display device 10 vibrates.

FIG. 14A illustrates merely an exemplary embodiment of the inventive concepts.

That is, various functions including or excluding the above functions may be executed according to whether a force has been applied to the first through seventh force sensing cells CE1a through CE7a of the first force sensor 510 located in the right curved portion of the display device 10 and the first through seventh force sensing cells CE1b through CE7b of the second force sensor 520 located in the left curved portion of the display device 10. In addition, different operations may be programmed for the first through seventh force sensing cells CE1a through CE7a of the first force sensor 510 located in the right curved portion of the display device 10 and the first through the seventh force sensing cells CE1b through CE7b of the second force sensor 520 located in the left curved portion of the display device 10.

According to the exemplary embodiment illustrated in FIGS. 14A and 14B, since the first force sensor 510 and the second force sensor 520 are disposed in the second areas DR2 corresponding to the curved portions of the display device 10, they can be utilized as physical buttons such as the volume control button, the power button, the call button, the camera button, the Internet button and the squeeze sensing button.

In addition, according to the exemplary embodiment illustrated in FIGS. 14A and 14B, when there is a user's input through an input sensing device, a vibration generator adjacent to the input sensing device among the first vibration generator 810 and the second vibration generator 820 may vibrate, thereby implementing the haptic function. Further, the first vibration generator 810 and the second vibration generator 820 may generate different vibrations by receiving different vibration data from the main processor 710. Therefore, the user can easily distinguish the above example functions based on different vibrations even without looking at the icons displayed on the display surface.

Specifically, when a force is applied to the first force sensing cell CE1a and the second force sensing cell CE2a (i.e., the volume up button cell group VB+) of the first force sensor 510, the third force sensing cell CE3a and the fourth force sensing cell CE4a (i.e., the volume down button cell group VB−), the fifth force sensing cell CE5a, the sixth force sensing cell CE6a and the seventh force sensing cell CE7a (i.e., the power button cell group PWB), and the eighth force sensing cell CE8a (i.e., the squeeze sensing button SB), the first vibration generator 810 may vibrate differently for each cell group. That is, the first vibration generator 810 and the second vibration generator 820 may vibrate differently, and, even within the first vibration generator 810, different vibrations may be generated depending on to which cell group a force is applied.

Similarly, when a force is applied to each of the above-described cell groups of the second force sensor 520, the second vibration generator 820 may vibrate differently for each cell group.

As described above, vibration data may have a plurality of parameters. The parameter may be a vibration displacement, a frequency, a period, a vibration displacement over time, a waveform, or duration. Specifically, each of the first vibration generator 810 and the second vibration generator 820 may receive vibration data regarding the vibration displacement, the frequency, the waveform, the duration, or the vibration displacement over time from the main processor 710 and generate a corresponding vibration. Further, the first vibration generator 810 may receive different vibration data regarding the vibration displacement, the frequency, the waveform, the duration, or the vibration displacement over time from the main processor 710 depending on to which cell group a force is applied. Thus, the first vibration generator 810 may vibrate differently when a force is applied to different cell groups of the first force sensor 510. The second vibration generator 820 may also vibrate in substantially the same way as the first vibration generator 810.

In an exemplary embodiment, the first vibration generator 810 may generate a first vibration, and the second vibration generator 820 may generate a second vibration.

In this specification, the vibration displacement refers to the amount of movement of a vibration generator from any reference point of the vibration generator. For example, the vibration displacement may refer to the amount of movement from the stop position of each of the first vibration generator 810 and the second vibration generator 820. The maximum vibration displacement may be a peak value of vibration displacement when the vibration generator vibrates in a periodic or aperiodic graph. The maximum vibration displacement of the first vibration may be greater than the maximum vibration displacement of the second vibration or, conversely, it may be less than the maximum vibration displacement of the second vibration. When the maximum vibration displacement of each of the first vibration and the second vibration is 10 μm or more, it may be an effective maximum vibration displacement at which a user starts to feel the vibration. When the maximum vibration displacement is 15 μm or more, it may be an effective maximum vibration displacement at which the user starts to feel the vibration sensitively. The maximum vibration displacement of each of the first vibration and the second vibration may be 10 μm or more. The maximum vibration displacement of each of the first vibration and the second vibration may be more preferably 15 μm or more.

If each of the first vibration and the second vibration of the first vibration generator 810 and the second vibration generator 820 is in the form of a periodic function, it may have a predetermined period or frequency.

If each of the first vibration and the second vibration has a specific waveform and the period of each of the first vibration and the second vibration is 10 ms or more, a user can recognize the specific waveform of each of the first vibration and the second vibration. In addition, if the period of each of the first vibration and the second vibration is more than 500 ms, when the user applies a force to a cell group having a first function and a cell group having a second function, a vibration generated in the cell group having the first function and a vibration generated in the cell group having the second function may interfere with each other. In this case, the user cannot distinguish the vibration of the cell group having the first function from the vibration of the cell group having the second function. Therefore, each of the first vibration and the second vibration may be designed to have a period of 500 ms or less. The period of each of the first vibration and the second vibration of the first vibration generator 810 and the second vibration generator 820 may be 10 ms to 500 ms in order to recognize a specific waveform of each vibration and distinguish a vibration from the other vibration. In addition, the frequency of each of the first vibration and the second vibration of the first vibration generator 810 and the second vibration generator 820 may be 0.1 Hz to 2 Hz.

The period of the first vibration may be different from the period of the second vibration. The period of the first vibration may be greater than the period of the second vibration or, conversely, may be less than the period of the second vibrator. In addition, the frequency of the first vibration may be lower than the frequency of the second vibration or, conversely, may be higher than the frequency of the second vibration.

The duration of the first vibration and the duration of the second vibration may be different. If the duration of the first vibration is different from the duration of the second vibration, a user can distinguish a cell group having a function and another cell group having another function based on the different durations of the first and second vibrations even without looking at icons respectively corresponding to the cell groups.

The vibration displacements or waveforms over time of the first vibration and the second vibration of the first vibration generator 810 and the second vibration generator 820 will now be described with reference to FIGS. 15A through 15K.

FIGS. 15A through 15K illustrate various vibrations of a vibration generator. FIGS. 15A through 15K show that the vibration of the vibration generator appears as a periodic function. In FIGS. 15A through 15K, the horizontal axis represents the vibration time (ms), and the vertical axis represents the vibration displacement (fan). The first and second vibration generators 810 and 820 may have vibrations according to FIGS. 15A through 15K. The first vibration generator 810 and the second vibration generator 820 may have a first vibration and a second vibration, respectively. The first vibration and the second vibration may be different. The first vibration generator 810 and the second vibration generator 820 may vibrate by receiving vibration data having vibration graphs of FIGS. 15A through 15K from the main processor 710. The first vibration generator 810 and the second vibration generator 820 may vibrate according to different vibration data. That is, the first vibration and the second vibration may be generated according to the graphs of FIGS. 15A through 15K but may be generated according to different vibration data.

FIGS. 15A through 15K may have first and second maximum vibration displacements A1 and A2. The first maximum vibration displacement A1 may correspond to a downwardly convex inflection point, and the second maximum vibration displacement A2 may correspond to an upwardly convex inflection point. As described above, in an embodiment, the maximum vibration displacements A1 and A2 may be 10 μm or more. The maximum vibration displacements A1 and A2 may be more preferably 15 μm or more.

In addition, the vibration periods of FIGS. 15A through 15K may be 10 ms to 500 ms.

Figure 15A:
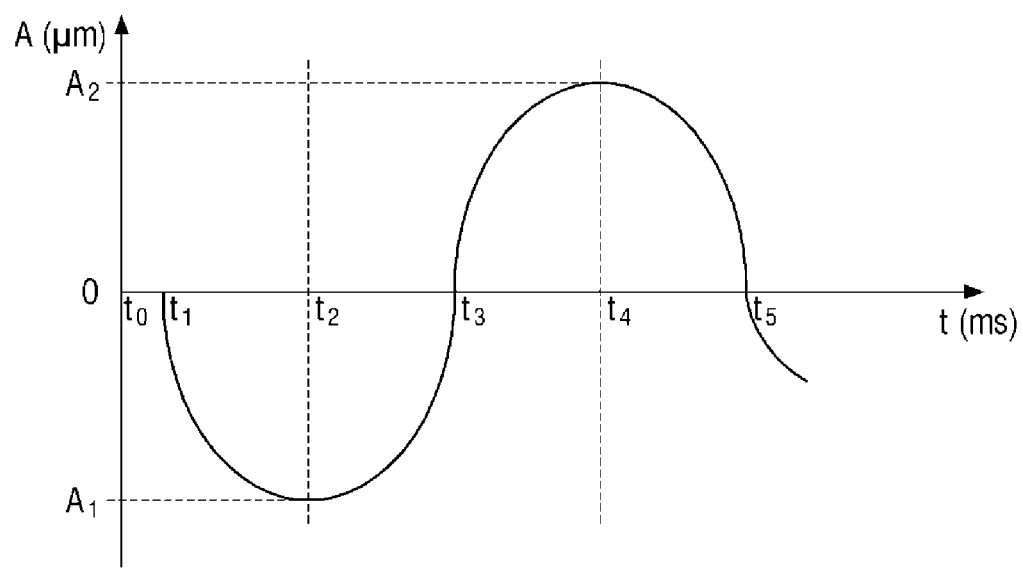
FIG. 15A, FIG. 15B, FIG. 15C, FIG. 15D, FIG. 15E, FIG. 15F, FIG. 15G, FIG. 15H, FIG. 15I, FIG. 15J, and FIG. 15K illustrate various vibrations of a vibration generator.

Referring to FIG. 15A, the vibration displacement may be zero from an initial time t0 to a first time t1. The vibration displacement may fall in a curve from the first time t1 to a second time t2 and may be the first maximum vibration displacement A1 at the second time t2. The vibration displacement may rise in a curve from the second time t2 to a third time t3 and may be zero at the third time t3. The vibration displacement may rise in a curve from the third time t3 to a fourth time t4. At the fourth time t4, the vibration displacement may be the second maximum vibration displacement A2. The vibration displacement may fall from the fourth time t4 to a fifth time t5. At the fifth time t5, the vibration displacement may be zero. The vibration period may be the time from the first time t1 to the fifth time t5. The vibration of FIG. 15A may be in the form of a sine wave.

Figure 15B:
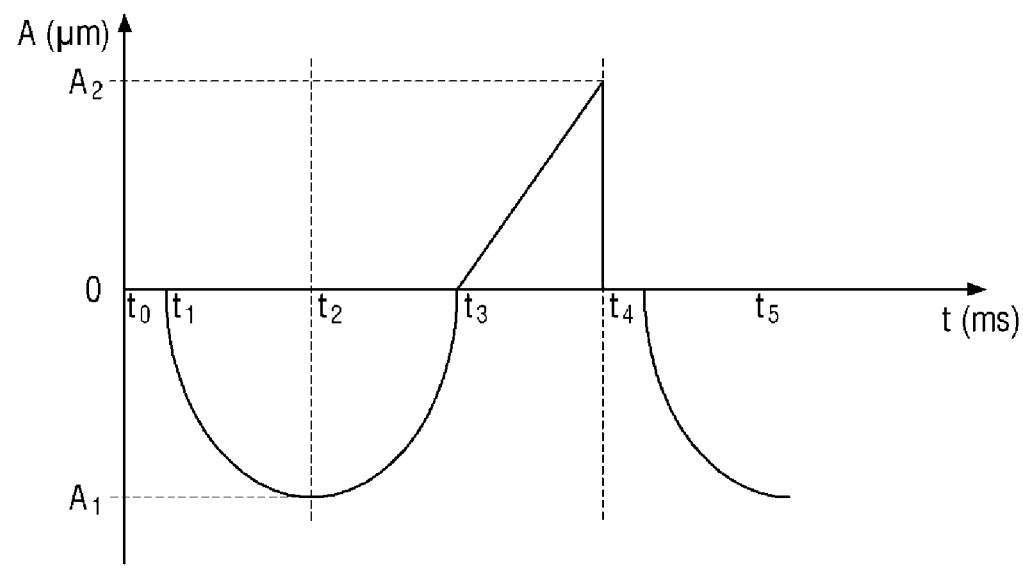

Referring to FIG. 15B, the vibration displacement may be zero from the initial time t0 to the first time t1. The vibration displacement may fall in a curve from the first time t1 to the second time t2 and may be the first maximum vibration displacement A1 at the second time t2. The vibration displacement may rise in a curve from the second time t2 to the third time t3. At the third time t3, the vibration displacement may be zero. The vibration displacement may increase linearly with a slope and in proportion to time from the third time t3 to the fourth time t4. In this case, the slope may be a constant value. The vibration displacement may be the second maximum vibration displacement A2 at the fourth time t4. At the fourth time t4, the vibration displacement may drop to zero. The vibration period may be the time from the first time t1 to the fourth time t4. The vibration of FIG. 15B may be in the form of a downwardly convex graph from the first time t1 to the third time t3 and an upward linear graph from the third time t3 to the fourth time t4.

Figure 15C:
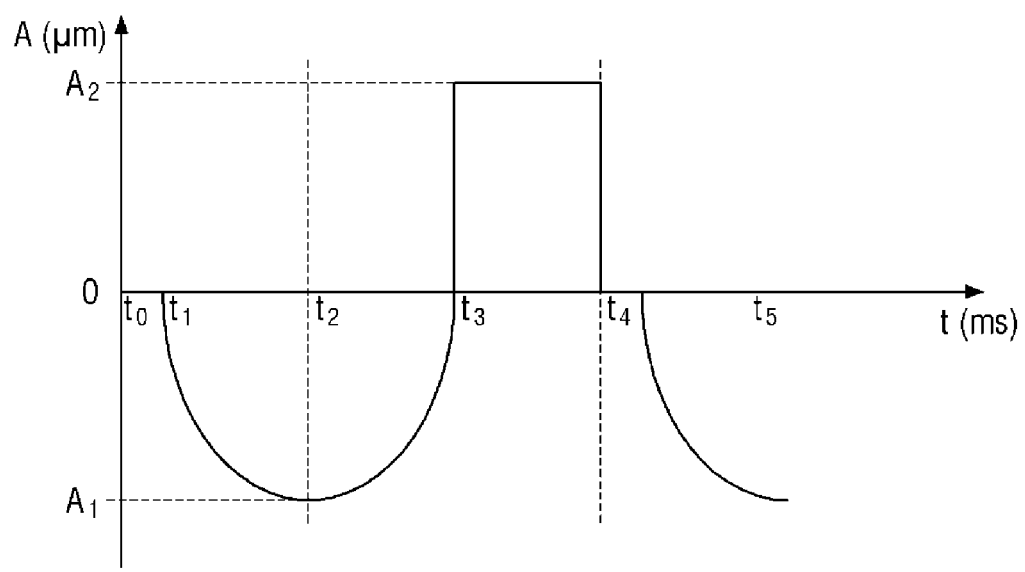

Referring to FIG. 15C, the vibration displacement may be zero from the initial time t0 to the first time t1. The vibration displacement may fall in a curve from the first time t1 to the second time t2 and may be the first maximum vibration displacement A1 at the second time t2. The vibration displacement may rise in a curve from the second time t2 to the third time t3. At the third time t3, the vibration displacement may be zero. The vibration displacement may rise again at the third time t3 and may be the second maximum vibration displacement A2 at the third time t3. The second maximum vibration displacement A2 may be maintained from the third time t3 to the fourth time t4. At the fourth time t4, the vibration displacement may drop to zero. The vibration period may be the time from the first time t1 to the third time t3. The vibration of FIG. 15C may be in the form of a downward convex graph from the first time t1 to the third time t3 and a rectangular graph from the third time t3 to the fourth time t4.

Figure 15D:
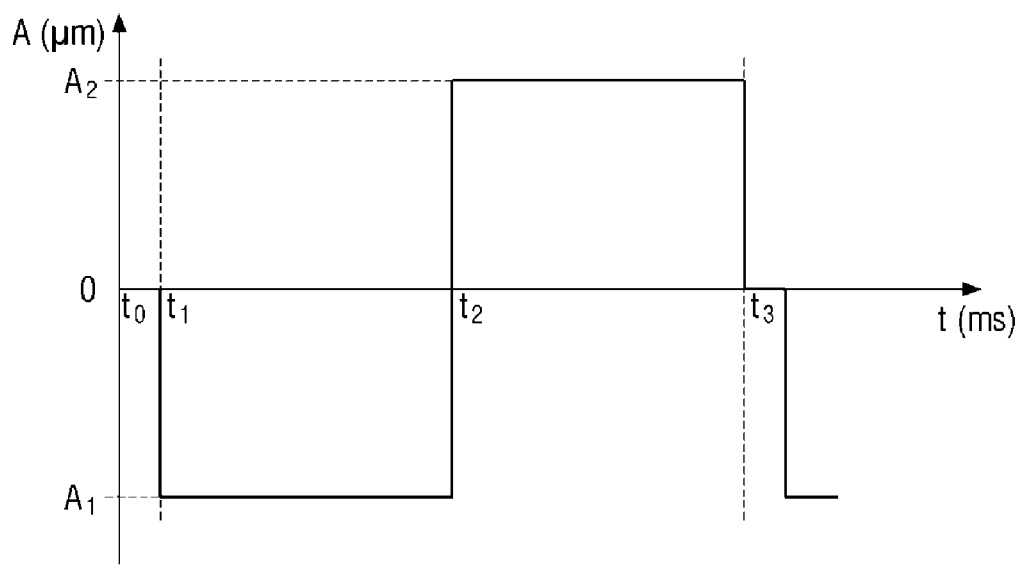

Referring to FIG. 15D, the vibration displacement may be zero from the initial time t0 to the first time t1. The vibration displacement may fall to the first maximum vibration displacement A1 at the first time t1. The first maximum vibration displacement A1 may be maintained from the first time t to the second time t2 and may rise to the second maximum vibration displacement A2 at the second time t2. The second maximum vibration displacement A2 may be maintained from the second time t2 to the third time t3. At the third time t3, the vibration displacement may be zero. The vibration period may be the time from the first time t1 to the third time t3. The vibration of FIG. 15D may be in the form of a downwardly protruding rectangular graph from the first time t1 to the second time t2 and an upwardly protruding rectangular graph from the second time t2 to the third time t3.

Figure 15E:
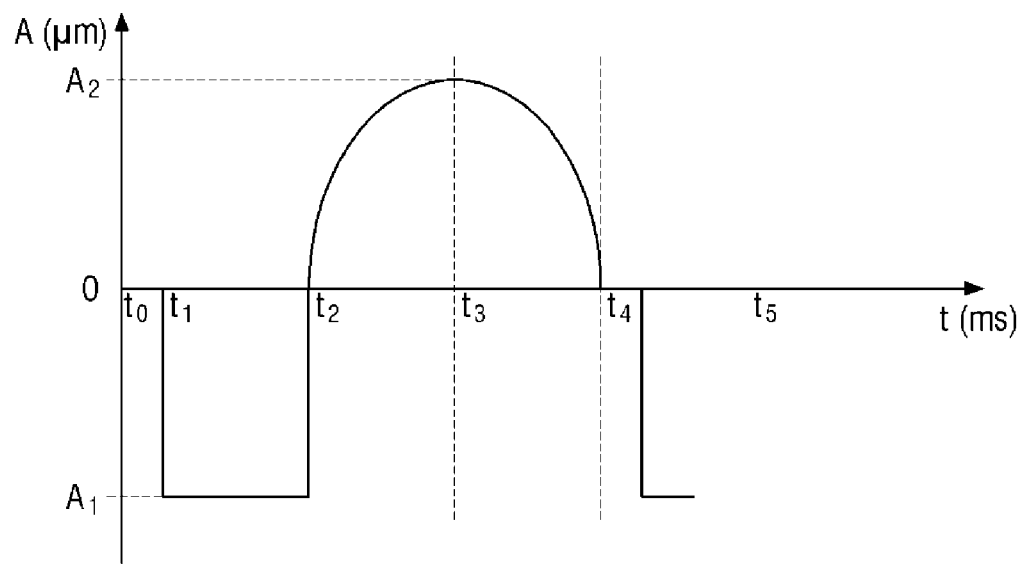

Referring to FIG. 15E, the vibration displacement may be zero from the initial time t0 to the first time t1. The vibration displacement may fall to the first maximum vibration displacement A1 at the first time t1. The first maximum vibration displacement A1 may be maintained from the first time t1 to the second time t2, and the vibration displacement may be zero at the second time t2. The vibration displacement may rise in a curve from the second time t2 to the third time t3. At the third time t3, the vibration displacement may be the second maximum vibration displacement A2. The vibration displacement may fall in a curve from the third time t3 to the fourth time t4 and may be zero at the fourth time t4. The vibration period may be the time from the first time t1 to the fourth time t4. The vibration of FIG. 15E may be in the form of a downwardly protruding rectangular graph from the first time t1 to the second time t2 and an upwardly convex graph from the second time t2 to the fourth time t4.

Figure 15F:
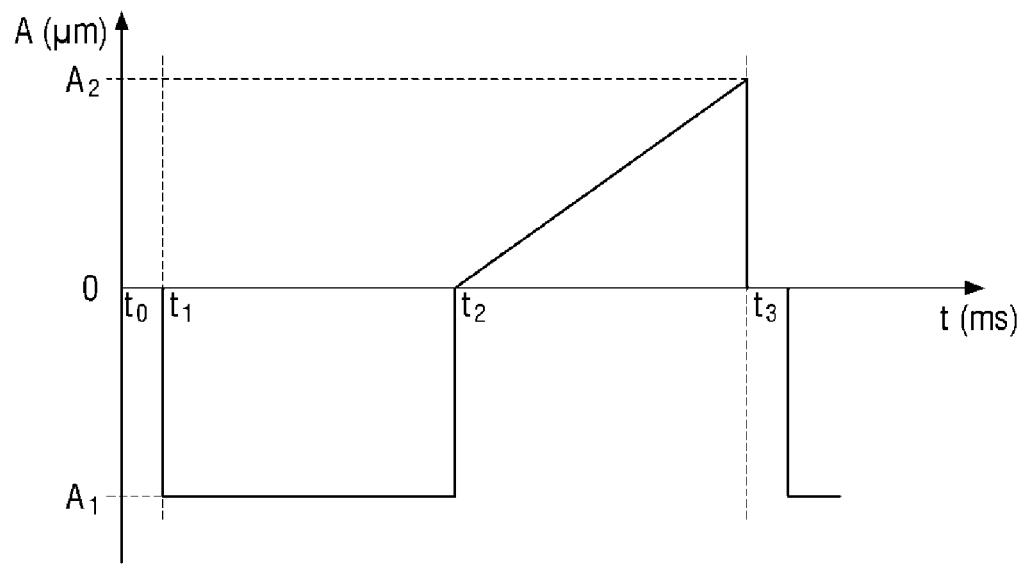

Referring to FIG. 15F, the vibration displacement may be zero from the initial time t0 to the first time t1. The vibration displacement may fall to the first maximum vibration displacement A1 at the first time t1. The first maximum vibration displacement A1 may be maintained from the first time t1 to the second time t2, and the vibration displacement may be zero at the second time t2. The vibration displacement may rise over time with a predetermined slope from the second time t2 to the third time t3. At the third time t3, the vibration displacement may be the second maximum vibration displacement A2. At the third time t3, the vibration displacement may be zero. The vibration period may be the time from the first time t1 to the third time t3. The vibration of FIG. 15E may be in the form of a downwardly protruding rectangular graph from the first time t1 to the second time t2 and an upward linear graph from the second time t2 to the third time t3.

Figure 15G:
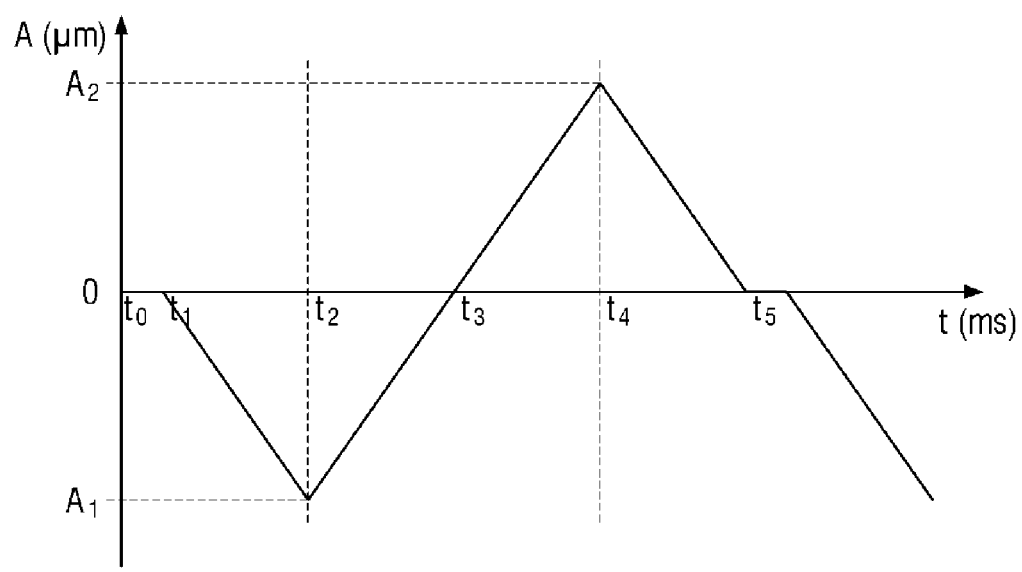

Referring to FIG. 15G, the vibration displacement may be zero from the initial time t0 to the first time t1. The vibration displacement may fall linearly with a predetermined constant negative slope from the first time t1 to the second time t2 and may be the first maximum vibration displacement A1 at the second time t2. The vibration displacement may rise linearly with a predetermined constant positive slope from the second time t2 to the third time t3 and may be zero at the third time t3. The vibration displacement may rise linearly with a constant positive slope from the third time t3 to the fourth time t4 and may be the second maximum vibration displacement A2 at the fourth time t4. The vibration displacement may fall linearly with a predetermined constant negative slope from the fourth time t4 to the fifth time t5 and may be zero at the fifth time t5. The vibration period may be the time from the first time t1 to the fifth time t5. The vibration of FIG. 15G may be in the form of a downwardly protruding triangular graph from the first time t1 to the third time t3 and an upwardly protruding triangular graph from the third time t3 to the fifth time t5.

Figure 15H:
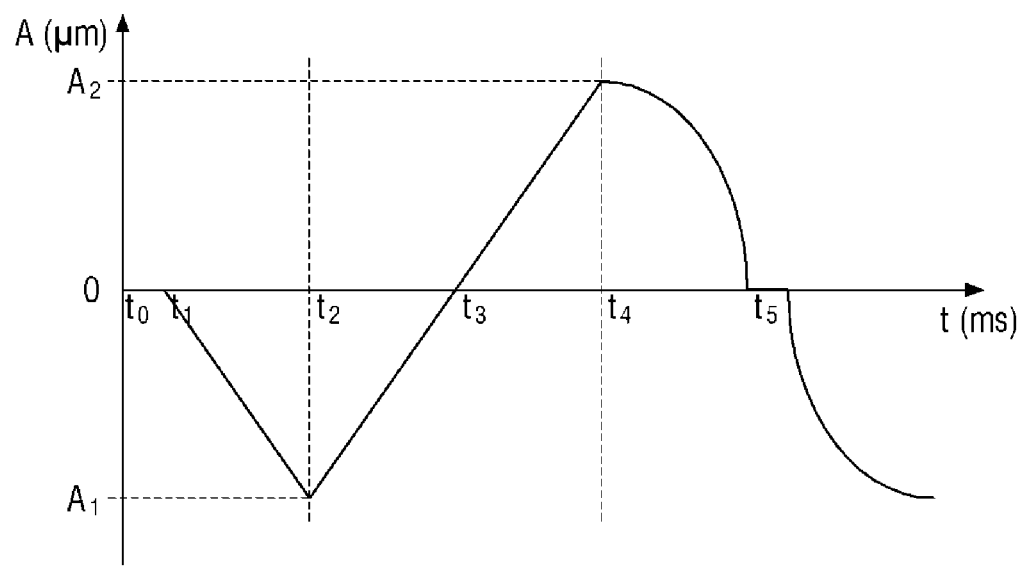

Referring to FIG. 15H, the vibration displacement may be zero from the initial time t0 to the first time t1. The vibration displacement may fall in a from the first time t1 to the second time t2 and may be the first maximum vibration displacement A1 at the second time t2. The vibration displacement may rise linearly with a constant positive slope from the second time t2 to the third time t3 and may be zero at the third time t3. The vibration displacement may rise linearly with a constant positive slope from the third time t3 to the fourth time t4 and may be the second maximum vibration displacement A2 at the fourth time t4. The vibration displacement may fall in a curve from the fourth time t4 to the fifth time 15 and may be zero at the fifth time t5. The vibration period may be the time from the first time t1 to the fifth time t5. The vibration of FIG. 15H may be in the form of downwardly protruding quadrantal and triangular graphs appearing from the first time t1 to the third time t3 and upwardly protruding triangular and quadrantal graphs appearing sequentially from the third time t3 to the fifth time t5.

Figure 15I:
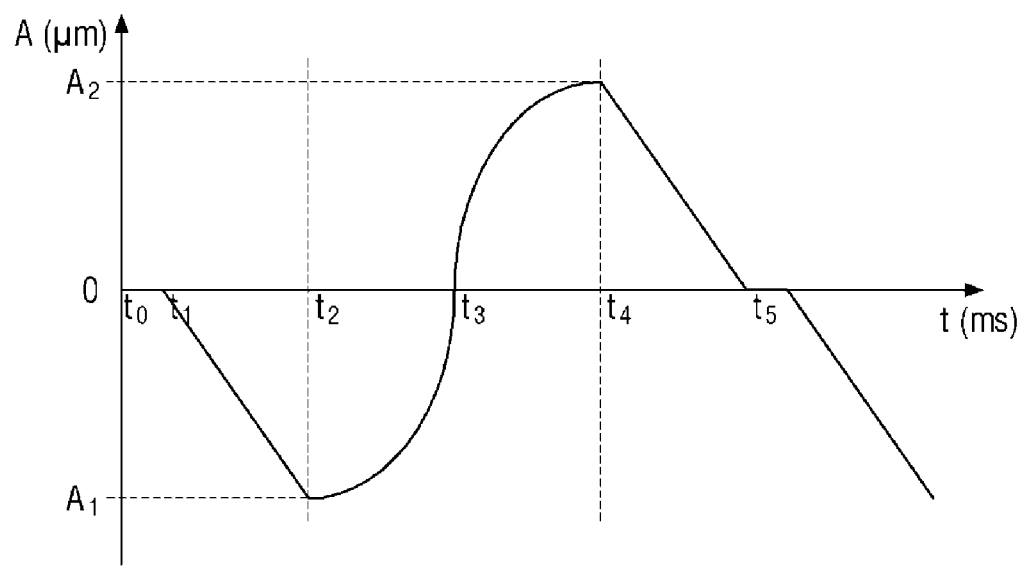

Referring to FIG. 15I, the vibration displacement may be zero from the initial time t0 to the first time t1. The vibration displacement may fall linearly with a predetermined constant negative slope from the first time t1 to the second time t2 and may be the first maximum vibration displacement A1 at the second time t2. The vibration displacement may rise in a curve from the second time t2 to the third time t3. At the third time t3, the vibration displacement may be zero. The vibration displacement may rise in a curve from the third time t3 to the fourth time t4 and may be the second maximum vibration displacement A2 at the fourth time t4. The vibration displacement may fall linearly with a predetermined constant negative slope from the fourth time t4 to the fifth time t5 and may be zero at the fifth time t5. The vibration period may be the time from the first time t1 to the fifth time t5. The vibration of FIG. 15I may be in the form of downwardly protruding triangular and quadrantal graphs appearing sequentially from the first time t1 to the third time t3 and upwardly protruding quadrantal and triangular graphs appearing sequentially from the third time t3 to the fifth time t5.

Figure 15J:
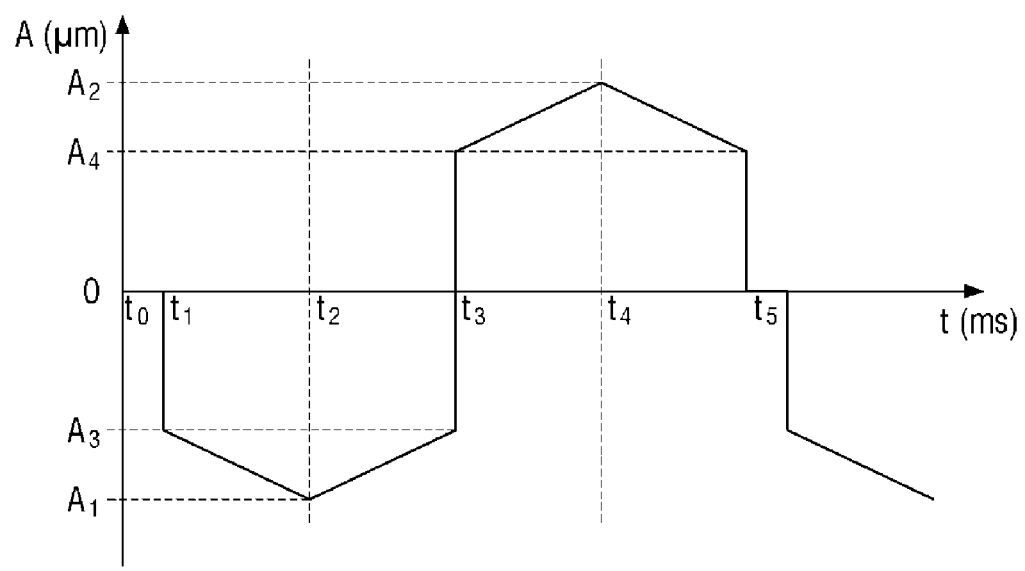

Referring to FIG. 15J, the vibration displacement may be zero from the initial time t0 to the first time t1. The vibration displacement may fall to a third vibration displacement A3 at the first time t1 and may fall linearly with a predetermined constant negative slope from the first time t1 to the second time t2. The third vibration displacement A3 may be a value between zero and the first maximum vibration displacement A1. The vibration displacement may be the first maximum vibration displacement A1 at the second time t2 and may rise in a curve from the second time t2 to the third time t3. The vibration displacement may be the third vibration displacement A3 at the third time t3. The vibration displacement may rise to a fourth vibration displacement A4 at the third time t3, may rise linearly with a predetermined constant positive slope from the third time t3 to the fourth time t4, and may be the second maximum vibration displacement A2 at the fourth time t4. The fourth vibration displacement A4 may be a value between zero and the second maximum vibration displacement A2. The vibration displacement may fall linearly with a predetermined constant negative slope from the fourth time t4 to the fifth time t5. The vibration displacement may be the fourth vibration displacement A4 at the fifth time t5. The vibration displacement may fall to zero at the fifth time t5. The vibration period may be the time from the first time t1 to the fifth time t5. The vibration of FIG. 15J may be in the form of a downwardly protruding pentagonal graph from the first time t1 to the third time t3 and an upwardly protruding pentagonal graph from the third time t3 to the fifth time t5.

Figure 15K:
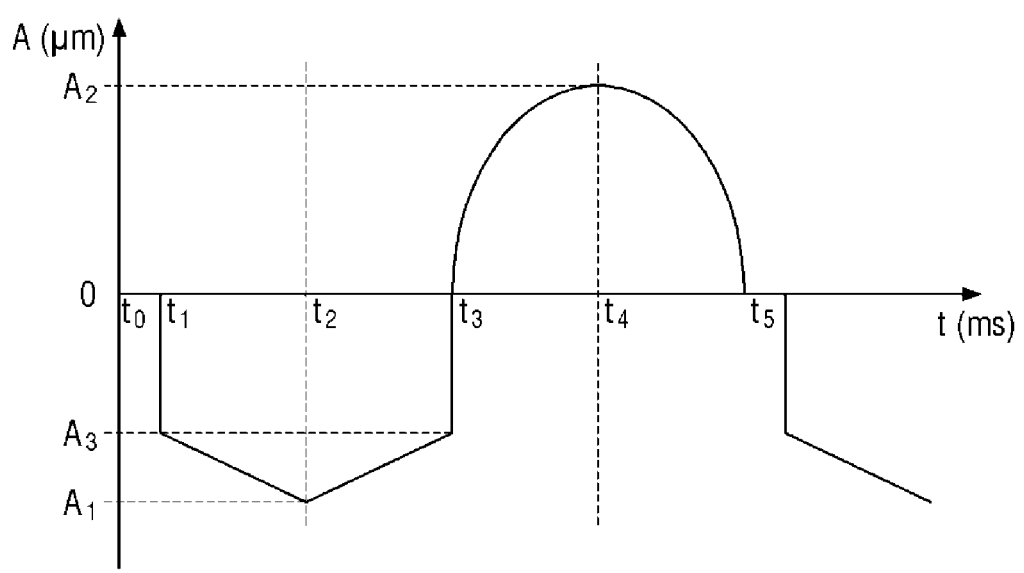

Referring to FIG. 15K, the vibration displacement may be substantially the same as that of FIG. 15J from the initial time t0 to the third time t3. The vibration displacement may be substantially the same as that of FIG. 15A from the third time t3 to the fifth time t5. The vibration period may be the time from the first time t1 to the fifth time t5. The vibration of FIG. 15K may be in the form of a downwardly protruding pentagonal graph from the first time t1 to the third time t3 and an upwardly convex graph from the third time t3 to the fifth time t5.

As described above, the first vibration generator 810 and the second vibration generator 820 vibrate by receiving vibration data having the vibration graphs of FIGS. 15A through 15K from the main processor 710. The first vibration generator 810 and the second vibration generator 820 may vibrate according to different vibration data. For example, when the first vibration generator 810 vibrates according to vibration data corresponding to FIG. 15A, the second vibration generator 820 may vibrate according to vibration data corresponding to FIGS. 15B through 15K. When the first vibration generator 810 vibrates according to vibration data corresponding to any one of FIGS. 15A through 15K, the second vibration generator 820 may vibrate according to vibration data corresponding to another graph different from the graph of the vibration data for the first vibration generator 810.

Although example vibration data graphs are illustrated in FIGS. 15A through 15K, the inventive concepts are not limited to these examples. The waveforms of the vibration data illustrated in FIGS. 15A through 15K have a downwardly or upwardly convex shape, a downwardly or upwardly protruding triangular shape, a downwardly or upwardly protruding rectangular shape, a downwardly or upwardly linear shape with a constant slope and a downwardly or upwardly protruding pentagonal shape, but vibration data having more various shapes can be provided. The various waveforms of FIGS. 15A through 15K can be combined with each other. The inventive concepts are not limited to the examples of FIGS. 15A through 15K, and the downwardly or upwardly convex shape, the downwardly or upwardly protruding triangular shape, the downwardly or upwardly protruding rectangular shape, the downwardly or upwardly linear shape with a constant slope, and the downwardly or upwardly protruding pentagonal shape can be variously combined with each other.

In addition, although FIGS. 15A through 15K illustrate waveforms having certain periods, the inventive concepts are not limited to this case. Vibration data having an aperiodic form may also be provided in the downwardly or upwardly convex shape, the downwardly or upwardly protruding triangular shape, the downwardly or upwardly protruding rectangular shape, the downwardly or upwardly linear shape with a constant slope, and the downwardly or upwardly protruding pentagonal shape.

Hereinafter, display devices according to other exemplary embodiments will be described. In the following exemplary embodiments, the same components as those described above will be indicated by the same reference numerals, and a redundant description of the components will be omitted or given briefly.

Figure 16:
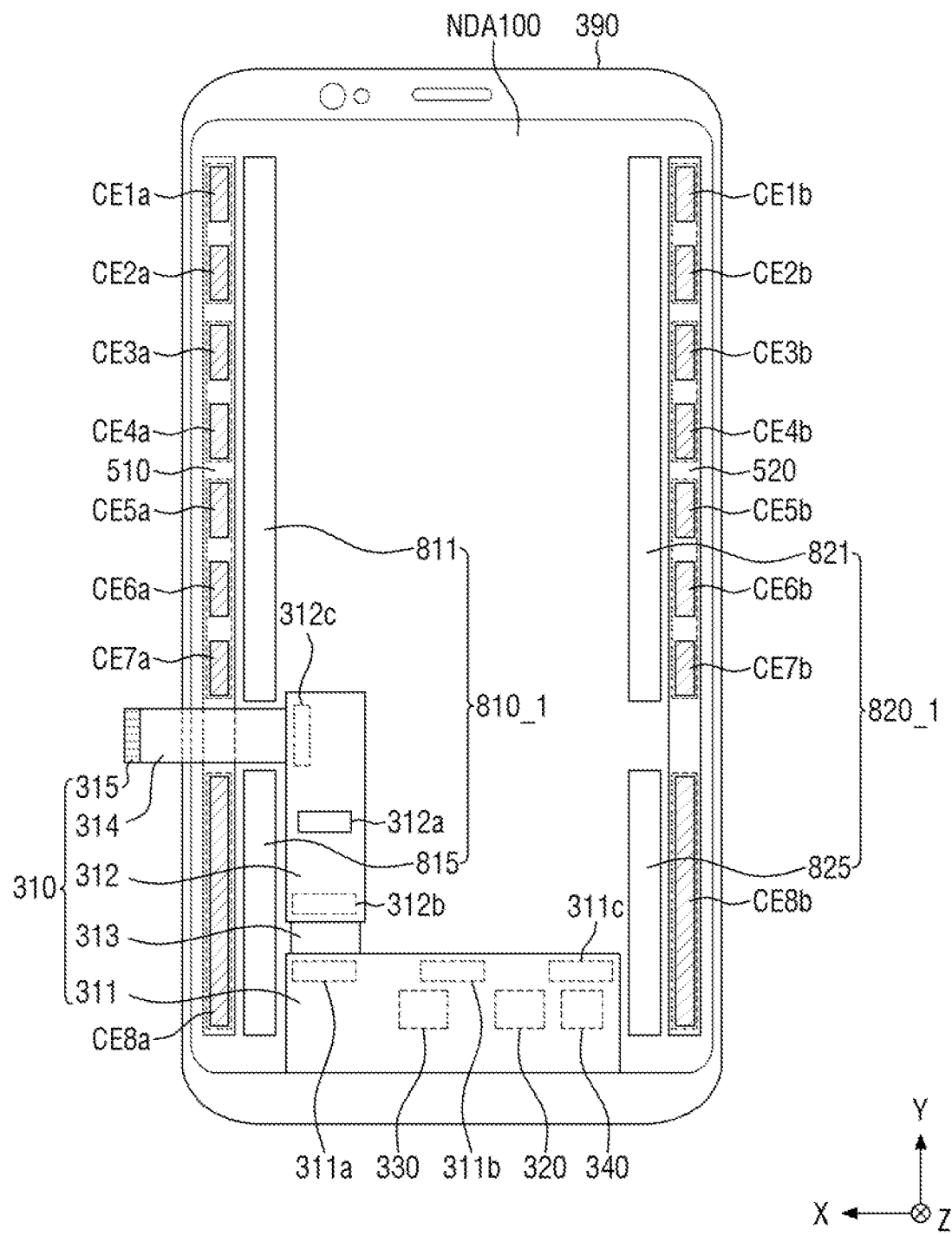
FIG. 16 is a bottom view of a display panel, illustrating vibration generators according to an exemplary embodiment.

FIG. 16 is a bottom view of a display panel, illustrating vibration generators according to an exemplary embodiment. FIG. 16 shows that each of the first vibration generator 810 and the second vibration generator 820 can have a plurality of sub-vibration generators.

Referring to FIG. 16, a first vibration generator 810_1 according to the current embodiment may include a first sub-vibration generator 811 and a second sub-vibration generator 815, and a second vibration generator 820_1 may include a first sub-vibration generator 821 and a second sub-vibration generator 825.

As described above, a first force sensor 510 may include a volume up button cell group VB+, a volume down button cell group VB−, a power button cell group PWB or a squeeze sensing button cell group SB of a display device 10, and a second force sensor 520 may include a call button cell group CB, a camera button cell group CMB, an Internet button cell group IB or a squeeze sensing button cell group SB. Each cell group may include a plurality of force sensing cells CE.

The first sub-vibration generator 811 of the first vibration generator 810_1 may be disposed adjacent to first through seventh force sensing cells CE1$a$ through CE7$a$ and may vibrate when a force is applied to the first through seventh force sensing cells CE1$a$ through CE7$a$. The first sub-vibration generator 811 of the first vibration generator 810_1 may vibrate when a force is applied to the volume up button cell group VB+, the volume down button cell group VB−, and the power button cell group PWB.

The second sub-vibration generator 815 of the first vibration generator 810_1 may be disposed adjacent to an eighth force sensing cell CE8$a$ and may vibrate when a force is applied to the eighth force sensing cell CE8$a$. The second sub-vibration generator 815 of the first vibration generator 810_1 may vibrate when a force is applied to the squeeze sensing button cell group SB.

The first sub-vibration generator 821 of the second vibration generator 820_1 may be disposed adjacent to first through seventh force sensing cells CE1$b$ through CE7$b$ and may vibrate when a force is applied to the first through seventh force sensing cells CE1$b$ through CE7$b$. The first sub-vibration generator 821 of the second vibration generator 820_1 may vibrate when a force is applied to the call button cell group CB, the camera button cell group CMB and the internet button cell group IB.

The second sub-vibration generator 825 of the second vibration generator 820_1 may be disposed adjacent to an eighth force sensing cell CE8$b$ and may vibrate when a force is applied to the eighth force sensing cell CE8$b$. The second sub-vibration generator 825 of the second vibration generator 820_1 may vibrate when a force is applied to the squeeze sensing button cell group SB.

The first sub-vibration generator 811 of the first vibration generator 810_1, the second sub-vibration generator 815 of the first vibration generator 810_1, the first sub-vibration generator 821 of the second vibration generator 820_1, and the second sub-vibration generator 825 of the second vibration generator 820_1 may vibrate differently from each other. That is, the first sub-vibration generator 811 of the first vibration generator 810_1, the second sub-vibration generator 815 of the first vibration generator 810_1, the first sub-vibration generator 821 of the second vibration generator 820_1 and the second sub-vibration generator 825 of the second vibration generator 820_1 may vibrate differently by receiving different vibration data adjusted to different vibration displacements, frequencies, periods, vibration displacements over time, waveforms, or durations.

However, the second sub-vibration generator 815 of the first vibration generator 810_1 and the second sub-vibration generator 825 of the second vibration generator 820_1 may vibrate identically when a force is applied to the squeeze sensing button cell group SB. That is, the second sub-vibration generator 815 of the first vibration generator 810_1 and the second sub-vibration generator 825 of the second vibration generator 820_1 may receive the same vibration data. As described above, the vibration data may be a vibration displacement, a frequency, a period, a vibration displacement over time, a waveform or duration.

Figure 17:
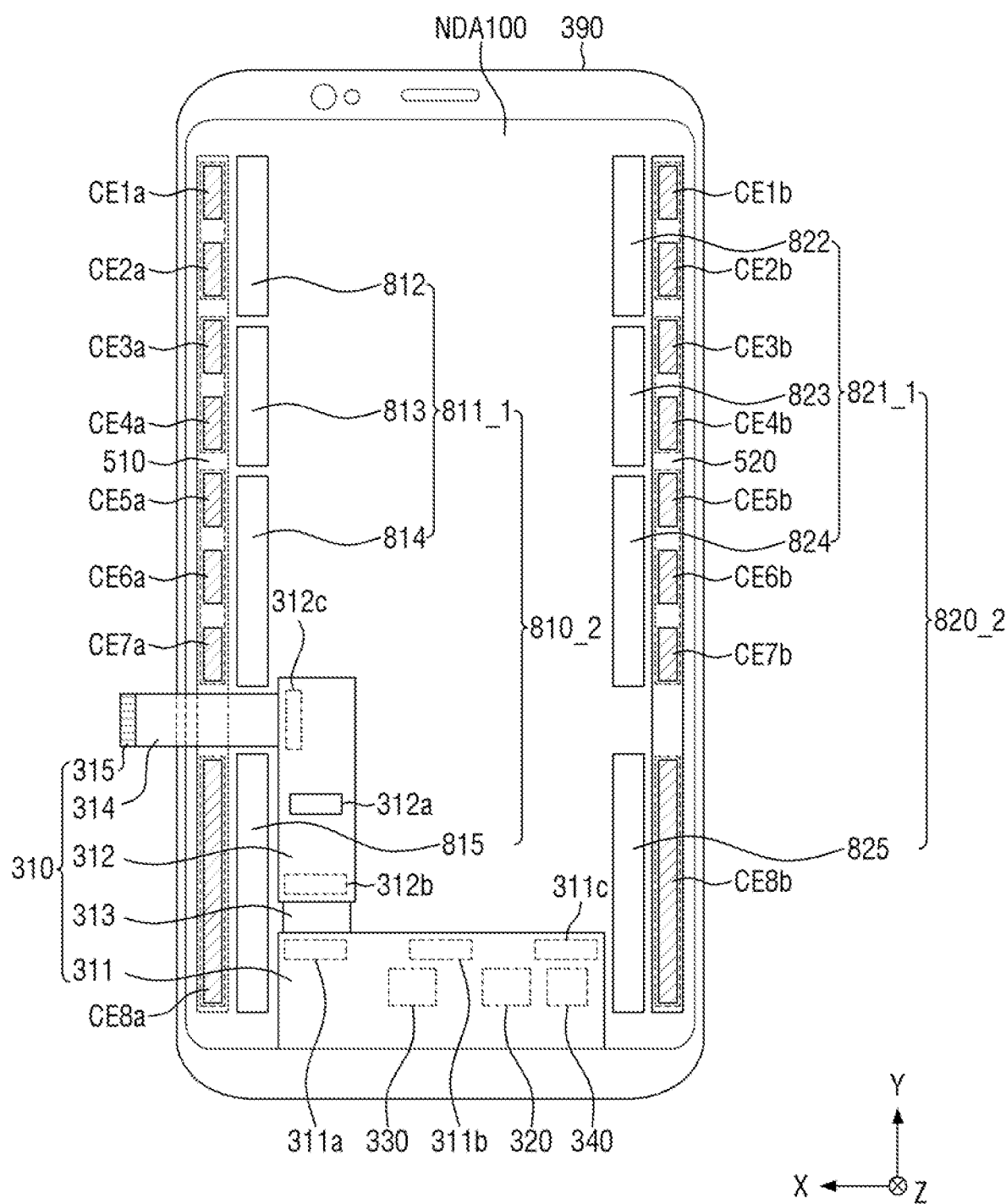
FIG. 17 is a bottom view of a display panel, illustrating vibration generators according to an exemplary embodiment.

FIG. 17 is a bottom view of a display panel, illustrating vibration generators according to an embodiment.

Referring to FIG. 17, first and second vibration generators 810_2 and 820_2 according to the current embodiment are different from the first and second vibration generators 810_1 and 820_1 of FIG. 16 in that a first sub-vibration generator 811_1 of the first vibration generator 810_2 is divided into three sub-vibration generators 812 through 814, and a first sub-vibration generator 821_1 of the second vibration generator 820_2 is divided into three sub-vibration generators 822 through 824.

More specifically, the first sub-vibration generator 811_1 of the first vibration generator 810_2 may include a (1-1)th sub-vibration generator 812, a (1-2)th sub-vibration generator 813 and a (1-3)th sub-vibration generator 814, and the first sub-vibration generator 821_1 of the second vibration generator 820_2 may include a (1-1)th sub-vibration generator 822, a (1-2)th sub-vibration generator 823 and a (1-3)th sub-vibration generator 824.

The (1-1)th sub-vibration generator 812 may be disposed adjacent to first and second force sensing cells CE1$a$ and CE2$a$. The first and second force sensing cells CE1$a$ and CE2$a$ may form a volume up button cell group VB+. The (1-1)th sub-vibration generator 812 may vibrate when a force is applied to the first and second force sensing cells CE1$a$ and CE2$a$. That is, the $(1-1)^{th}$ sub-vibration generator 812 may vibrate when a force is applied to the volume up button cell group VB+.

The $(1-2)^{th}$ sub-vibration generator 813 may be disposed adjacent to third and fourth force sensing cells CE3$a$ and CE4$a$. The third and fourth force sensing cells CE3$a$ and CE4$a$ may form a volume down button cell group VB−. The $(1-2)^{th}$ sub-vibration generator 813 may vibrate when a force is applied to the third and fourth force sensing cells CE3$a$ and CE4$a$. That is, the $(1-2)^{th}$ sub-vibration generator 813 may vibrate when a force is applied to the volume down button cell group VB−.

The $(1-3)^{th}$ sub-vibration generator 814 may be disposed adjacent to fifth through seventh force sensing cells CE5$a$ through CE7$a$. The fifth through seventh force sensing cells CE5$a$ through CE7$a$ may form a power button cell group PWB. The $(1-3)^{th}$ sub-vibration generator 814 may vibrate when a force is applied to the fifth through seventh force sensing cells CE5$a$ through CE7$a$. That is, the $(1-3)^{th}$ sub-vibration generator 814 may vibrate when a force is applied to the power button cell group PWB.

The $(1-1)^{th}$ sub-vibration generator 822 may be disposed adjacent to first and second force sensing cells CE1$b$ and CE2$b$. The first and second force sensing cells CE1$b$ and CE2$b$ may form a call button cell group CB. The $(1-1)^{th}$ sub-vibration generator 822 may vibrate when a force is applied to the first and second force sensing cells CE1$b$ and CE2$b$. That is, the $(1-1)^{th}$ sub-vibration generator 822 may vibrate when a force is applied to the call button cell group CB.

The $(1-2)^{th}$ sub-vibration generator 823 may be disposed adjacent to third and fourth force sensing cells CE3$b$ and CE4$b$. The third and fourth force sensing cells CE3$b$ and CE4$b$ may form a camera button cell group CMB. The $(1-2)^{th}$ sub-vibration generator 823 may vibrate when a force is applied to the third and fourth force sensing cells CE3$b$ and CE4$b$. That is, the $(1-2)^{th}$ sub-vibration generator 823 may vibrate when a force is applied to the camera button cell group CMB.

The $(1-3)^{th}$ sub-vibration generators 824 may be disposed adjacent to fifth through seventh force sensing cells CE5$b$ through CE7$b$. The fifth through seventh force sensing cells CE5$b$ through CE7$b$ may form an Internet button cell group IB. The $(1-3)^{th}$ sub-vibration generator 824 may vibrate when a force is applied to the fifth through seventh force sensing cells CE5$b$ through CE7$b$. That is, the $(1-3)^{th}$ sub-vibration generator 824 may vibrate when a force is applied to the Internet button cell group IB.

The $(1-1)^{th}$ sub-vibration generator 812, the $(1-2)^{th}$ sub-vibration generator 813 and the $(1-3)^{th}$ sub-vibration generator 814 of the first vibration generator 810_2 and the $(1-1)^{th}$ sub-vibration generator 822, the $(1-2)^{th}$ sub-vibration generator 823 and the $(1-3)^{th}$ sub-vibration generator 824 of the second vibration generator 820_2 may vibrate differently. That is, the $(1-1)^{th}$ sub-vibration generator 812, the $(1-2)^{th}$ sub-vibration generator 813 and the $(1-3)^{th}$ sub-vibration generator 814 of the first vibration generator 810_2 and the $(1-1)^{th}$ sub-vibration generator 822, the $(1-2)^{th}$ sub-vibration generator 823 and the $(1-3)^{th}$ sub-vibration generator 824 of the second vibration generator 820_2 may vibrate differently by receiving different vibration data adjusted to different vibration displacements, frequencies, periods, vibration displacements over time, waveforms, or durations.

Although each of the first sub-vibration generators 811_1 and 821_1 is divided into three sub-vibration generators in FIG. 17, the present disclosure is not limited to this case, and a sub-vibration generator divided into two sub-vibration generators may also be provided. For example, the $(1-1)^{th}$ sub-vibration generator 812 and the $(1-2)^{th}$ sub-vibration generator 813 of the first vibration generator 810_2 may be integrally formed without being separated from each other. Alternatively, the $(1-2)^{th}$ sub-vibration generator 813 and the $(1-3)^{th}$ sub-vibration generator 814 may be integrally formed without being separated from each other. Likewise, the $(1-1)^{th}$ sub-vibration generator 822 and the $(1-2)^{th}$ sub-vibration generator 823 of the second vibration generator 820_2 may be integrally formed without being separated from each other. Alternatively, the $(1-2)^{th}$ sub-vibration generator 823 and the $(1-3)^{th}$ sub-vibration generator 824 may be integrally formed without being separated from each other.

Figure 18:
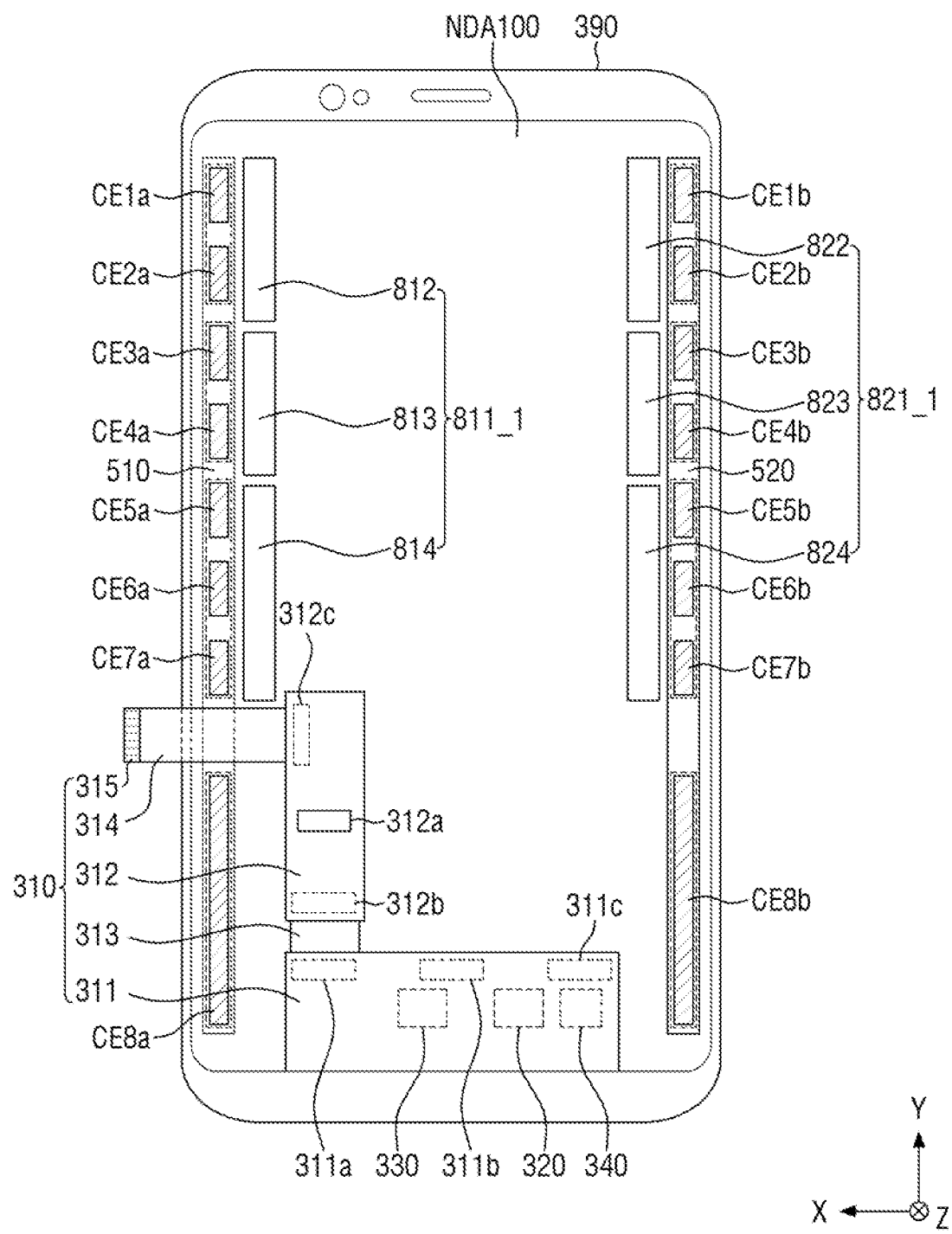
FIG. 18 is a bottom view of a display panel, illustrating vibration generators according to an exemplary embodiment.

FIG. 18 is a bottom view of a display panel, illustrating vibration generators according to an exemplary embodiment.

Referring to FIG. 18, first and second vibration generators 810_3 and 820_3 according to the current exemplary embodiment are different from the first and second vibration generators 810_2 and 820_2 of FIG. 17 in that second sub-vibration generators 815 and 825 of FIG. 17 are not provided, and a third vibration generator 910 of a lower cover 900 functions as the second sub-vibration generators 815 and 825.

As described above, the third vibration generator 910 may be disposed on a surface of the lower cover 900. The third vibration generator 910 may vibrate when a force is applied to an eighth force sensing cell CE8$a$ or an eighth force sensing cell CE8$b$. That is, the third vibration generator 910 may vibrate when a force is applied to a squeeze sensing button cell group SB.

The third vibration generator 910 may vibrate identically when a force is applied to the eighth force sensing cell CE8$a$ and when a force is applied to the eighth force sensing cell CE8$b$. That is, the third vibration generator 910 may vibrate by receiving the same vibration data from a main processor 710 when a force is applied to the eighth force sensing cell CE8$a$ and when a force is applied to the eighth force sensing cell CE8$b$. However, the inventive concepts are not limited to this case, and the third vibration generator 910 may also vibrate differently when a force is applied to the eighth force sensing cell CE8$a$ and when a force is applied to the eighth force sensing cell CE8$b$. That is, the third vibration generator 910 may vibrate by receiving different vibration data from the main processor 710 when a force is applied to the eighth force detecting cell CE8$a$ and when a force is applied to the eighth force detecting cell CE8$b$.

Figure 19:
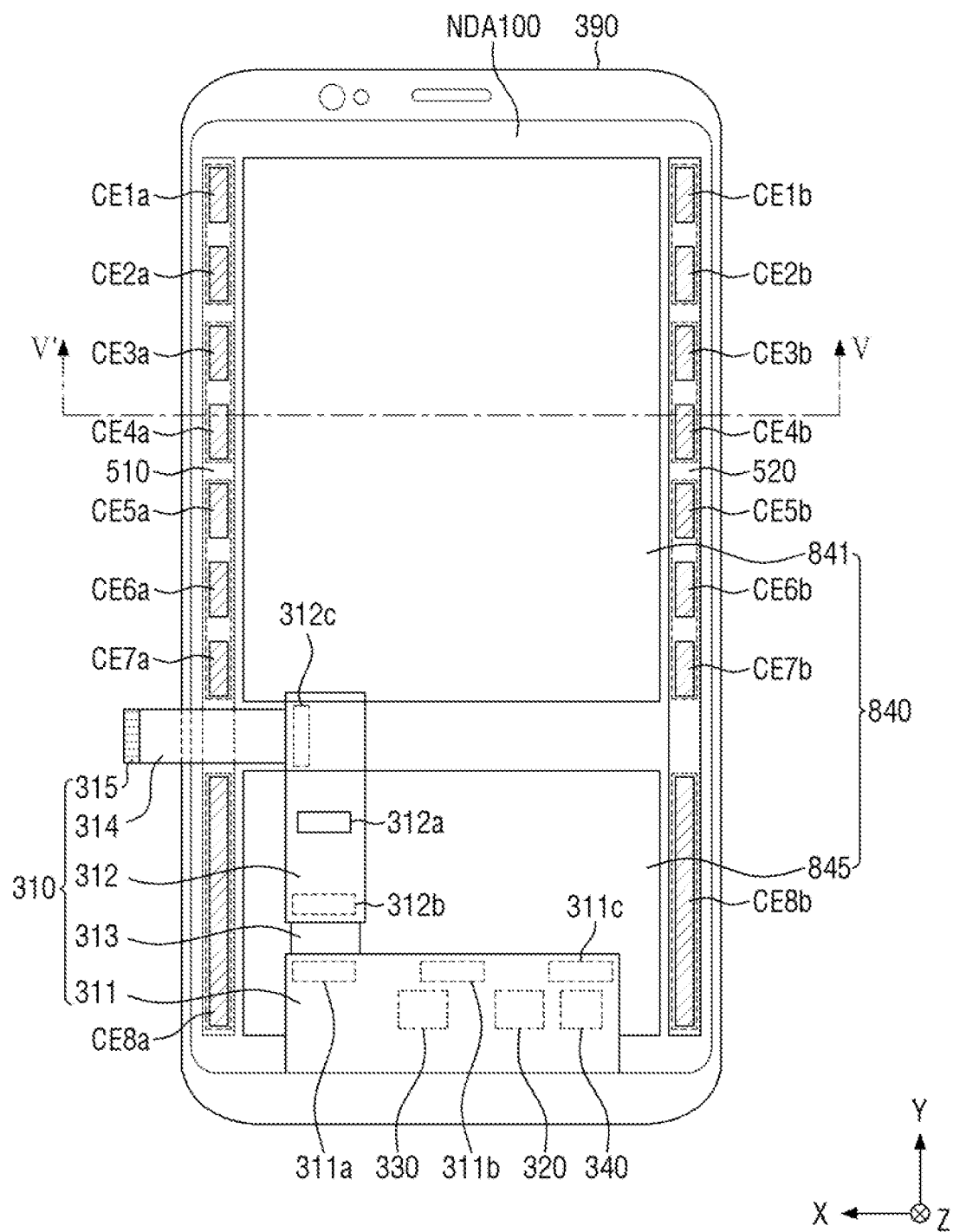
FIG. 19 is a bottom view of a display panel, illustrating a vibration generator according to an exemplary embodiment.
Figure 20:
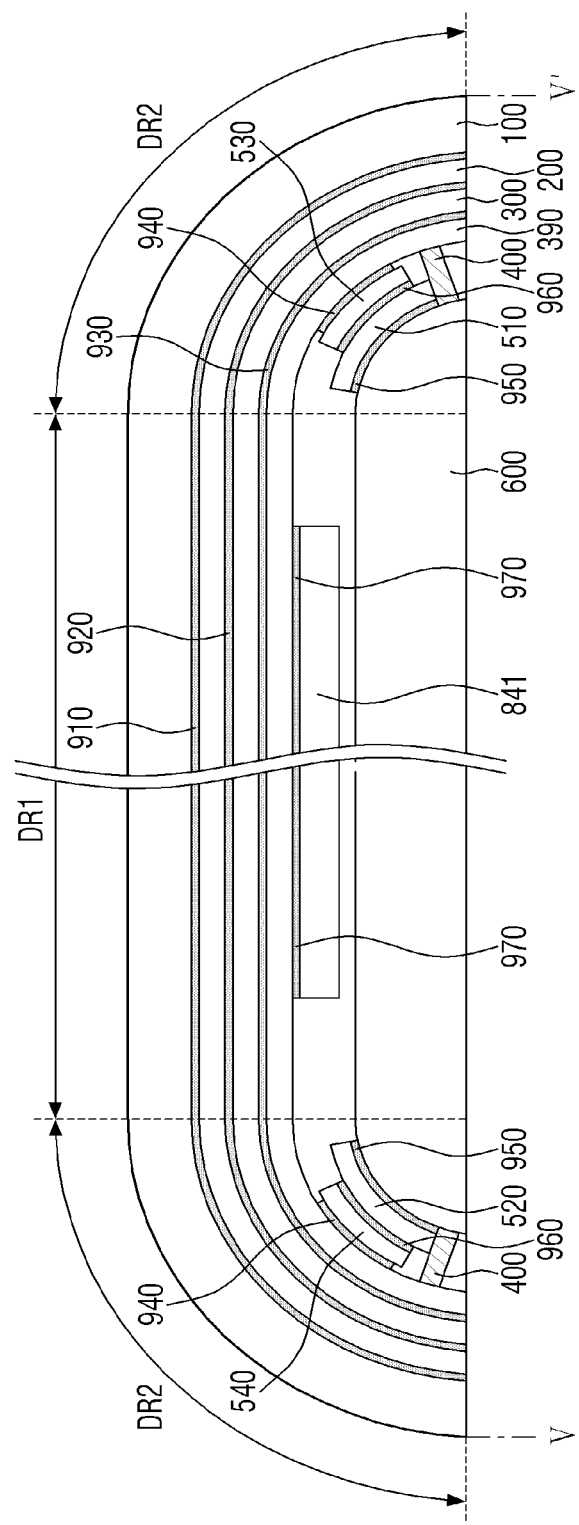
FIG. 20 is a cross-sectional view illustrating an example of V-V' of FIG. 19.

FIG. 19 is a bottom view of a display panel, illustrating a vibration generator according to an exemplary embodiment. FIG. 20 is a cross-sectional view illustrating an example of V-V' of FIG. 19.

In FIGS. 19 and 20, a fourth vibration generator 840 is disposed between a first force sensor 510 and a second force sensor 520.

Referring to FIGS. 19 and 20, the fourth vibration generator 840 may be disposed between the first force sensor 510 and the second force sensor 520. The fourth vibration generator 840 may have a first sub-vibration generator 841 and a second sub-vibration generator 845.

The first sub-vibration generator 841 may be disposed between first through seventh force sensing cells CE1a through CE7a and CE1b through CE7b. The first sub-vibration generator 841 may vibrate when a force is sensed in the first through seventh force sensing cells CE1a through CE7a and CE1b through CE7b. The first sub-vibration generator 841 may vibrate identically when a force is applied to the first through seventh force sensing cells CE1a through CE7a and when a force is applied to the first through seventh force sensing cells CE1b through CE7b. That is, the first sub-vibration generator 841 may vibrate by receiving the same vibration data when a force is applied to the first through seventh force sensing cells CE1a through CE7a and when a force is applied to the first through seventh force sensing cells CE1b through CE7b. However, the present disclosure is not limited to this case, and the first sub-vibration generator 841 may also vibrate by receiving different vibration data when a force is applied to the first through seventh force sensing cells CE1a through CE7b and when a force is applied to the first through seventh force sensing cells CE1b through CE7b.

In addition, the first sub-vibration generator 841 may vibrate differently when a force is applied to different cell groups. That is, the first sub-vibration generator 841 may generate different vibrations when a force is applied to different cell groups. As mentioned above, the different cell groups may include a volume up button cell group VB+, a volume down button cell group VB−, a power button cell group PWB, a call button cell group CB, a camera button cell group CMB, and an Internet button cell group IB.

The second sub-vibration generator 845 may be adjacent to eighth force sensing cells CE8a and CE8b. The second sub-vibration generator 845 may be disposed between the eighth force sensing cell CE8a of the first force sensor 510 and the eighth force sensing cell CE8b of the second force sensor 520. The second sub-vibration generator 845 may vibrate when a force is applied to the eighth force sensing cells CE8a and CE8b. The second sub-vibration generator 845 may vibrate identically when a force is applied to the eighth force sensing cell CE8a of the first force sensor 510 and when a force is applied to the eighth force sensing cell CE8b of the second force sensor 520. That is, the second sub-vibration generator 845 may vibrate by receiving the same vibration data from a main processor 710 when a force is applied to the eighth force sensing cell CE8a of the first force sensor 510 and when a force is applied to the eighth force sensing cell CE8b of the second force sensor 520. However, the present disclosure is not limited to this case, and the second sub-vibration generator 845 may also vibrate differently by receiving different vibration data from the main processor 710 when a force is applied to the eighth force sensing cell CE8a of the first force sensor 510 and when a force is applied to the force sensing cell CE8b of the second force sensor 520.

Figure 21:
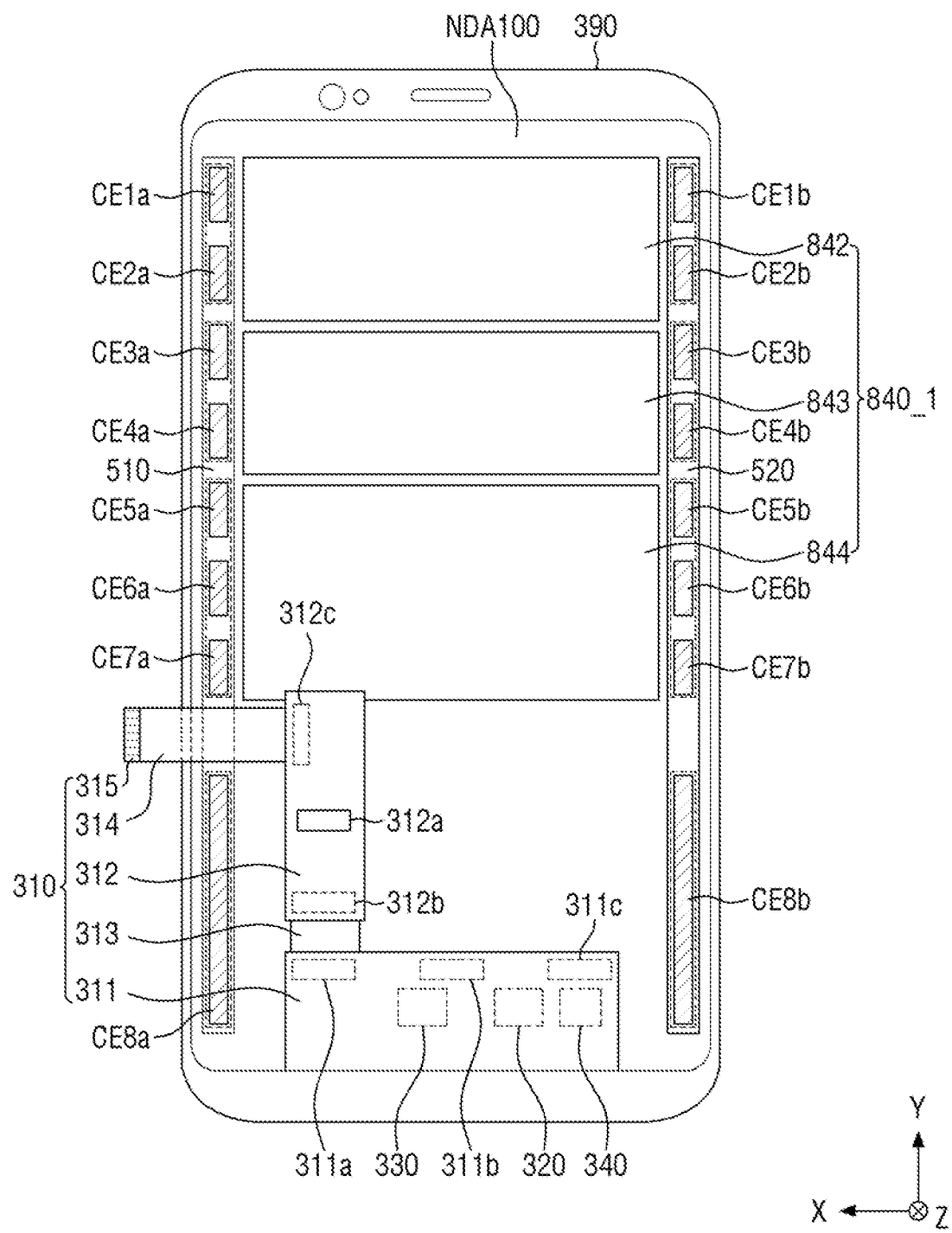
FIG. 21 is a bottom view of a display panel, illustrating a vibration generator according to an exemplary embodiment.

FIG. 21 is a bottom view of a display panel, illustrating a vibration generator according to an exemplary embodiment.

Referring to FIG. 21, a vibration generator 840_1 according to the current exemplary embodiment is different from the vibration generator 840 of FIG. 20 in that the first sub-vibration generator 841 of FIG. 20 is divided into a $(1-1)^{th}$ sub-vibration generator 842, a $(1-2)^{th}$ sub-vibration generator 843 and a $(1-3)^{th}$ sub-vibration generator 844.

The $(1-1)^{th}$ sub-vibration generator 842 is different from FIG. 17 in that it is an integration of the $(1-1)^{th}$ sub-vibration generator 812 and the (1-1)th sub-vibration generator 822 of FIG. 17, the (1-2)th sub-vibration generator 843 is different from FIG. 17 in that it is an integration of the (1-2)th sub-vibration generator 813 and the (1-2)th sub-vibration generator 823 of FIG. 17, and the (1-3)th sub-vibration generator 844 is different from FIG. 17 in that it is an integration of the (1-3)th sub-vibration generator 814 and the (1-3)th sub-vibration generator 824 of FIG. 17.

In addition, the $(1-1)^{th}$ sub-vibration generator 842 may vibrate when a force is applied to first and second force sensing cells CE1a and CE2a of a first force sensor 510 or when a force is applied to first and second force sensing cells CE1b and CE2b of a second force sensor 520. The $(1-1)^{th}$ sub-vibration generator 842 may vibrate differently when a force is applied to the first and second force sensing cells CE1a and CE2a of the first force sensor 510 and when a force is applied to the first and second force sensing cells CE1b and CE2b of the second force sensor 520. However, the inventive concepts are not limited to this case, and the $(1-1)^{th}$ sub-vibration generator 842 may also vibrate identically when a force is applied to the first and second force sensing cells CE1a and CE2a of the first force sensor 510 and when a force is applied to the first and second force sensing cells CE1b and CE2b of the second force sensor 520.

Each of the (1-2)th sub-vibration generator 843 and the (1-3)th sub-vibration generator 844 may also vibrate identically or differently when a force is applied to force sensing cells of the first force sensor 510 which are adjacent to the (1-2)th sub-vibration generator 843 or the (1-3)th sub-vibration generator 844 and when a force is applied to force sensing cells of the second force sensor 520 which are adjacent to the (1-2)th sub-vibration generator 843 or the (1-3)th sub-vibration generator 844

Figure 22:
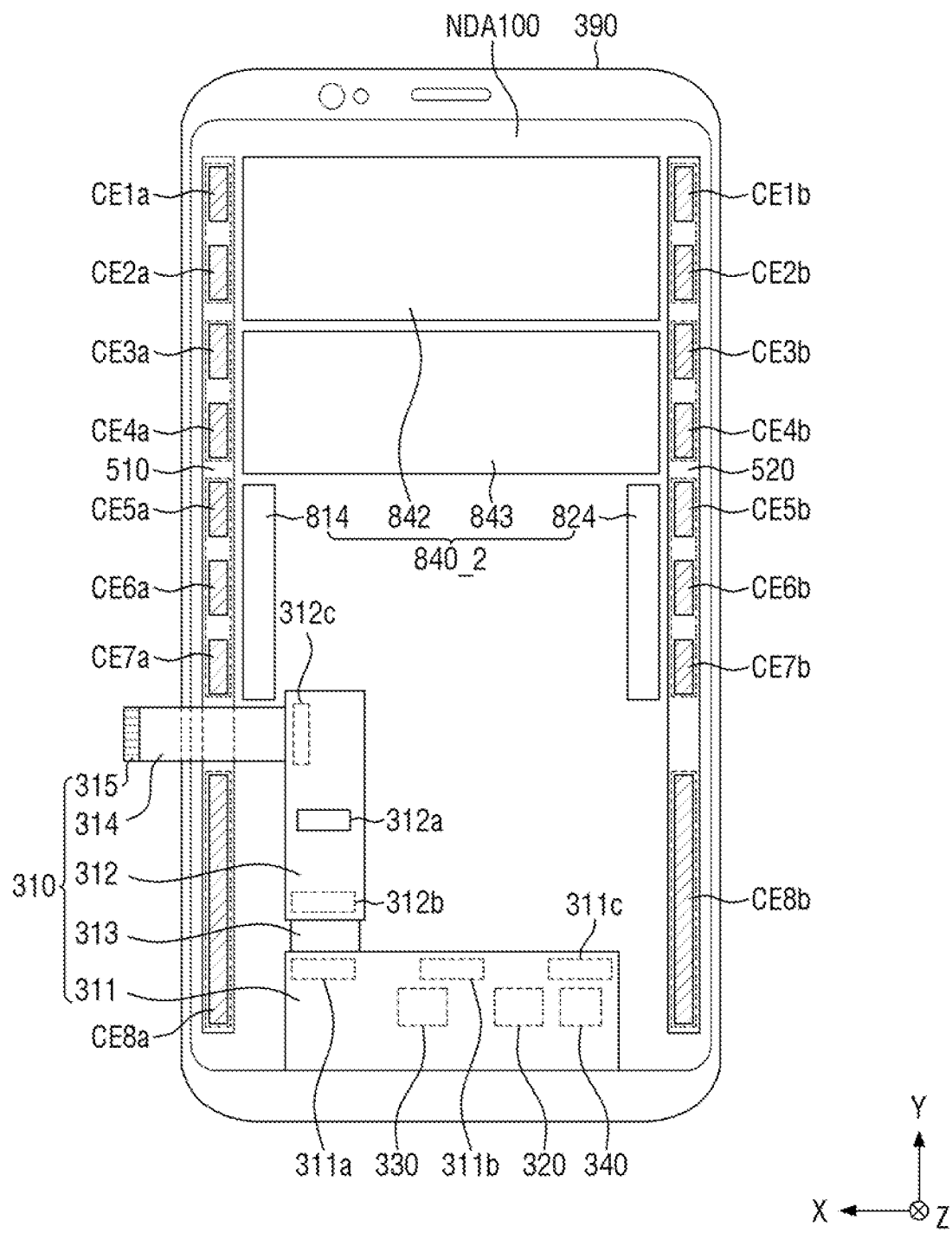
FIG. 22 is a bottom view of a display panel, illustrating a vibration generator according to an exemplary embodiment.

FIG. 22 is a bottom view of a display panel, illustrating a vibration generator according to an exemplary embodiment.

Referring to FIG. 22, a vibration generator 840_2 according to the current embodiment is different from the vibration generator 840_1 of FIG. 21 in that it includes (1-3)th sub-vibration generators 814 and 824. In FIG. 22, the (1-3)th sub-vibration generators 814 and 824 are provided, and the (1-3)th sub-vibration generator 844 of FIG. 21 is not provided. However, the inventive concepts are not limited to this case. For example, any one or two of the (1-1)th sub-vibration generators 812 and 822 and the (1-2)th sub-vibration generators 813 and 823 may be provided, and a (1-1)th sub-vibration generator 842 and a (1-2)th sub-vibration generator 843 corresponding in position to the (1-1)th sub-vibration generators 812 and 822 and the (1-2)th sub-vibration generators 813 and 823 may not be provided.

Figure 23:
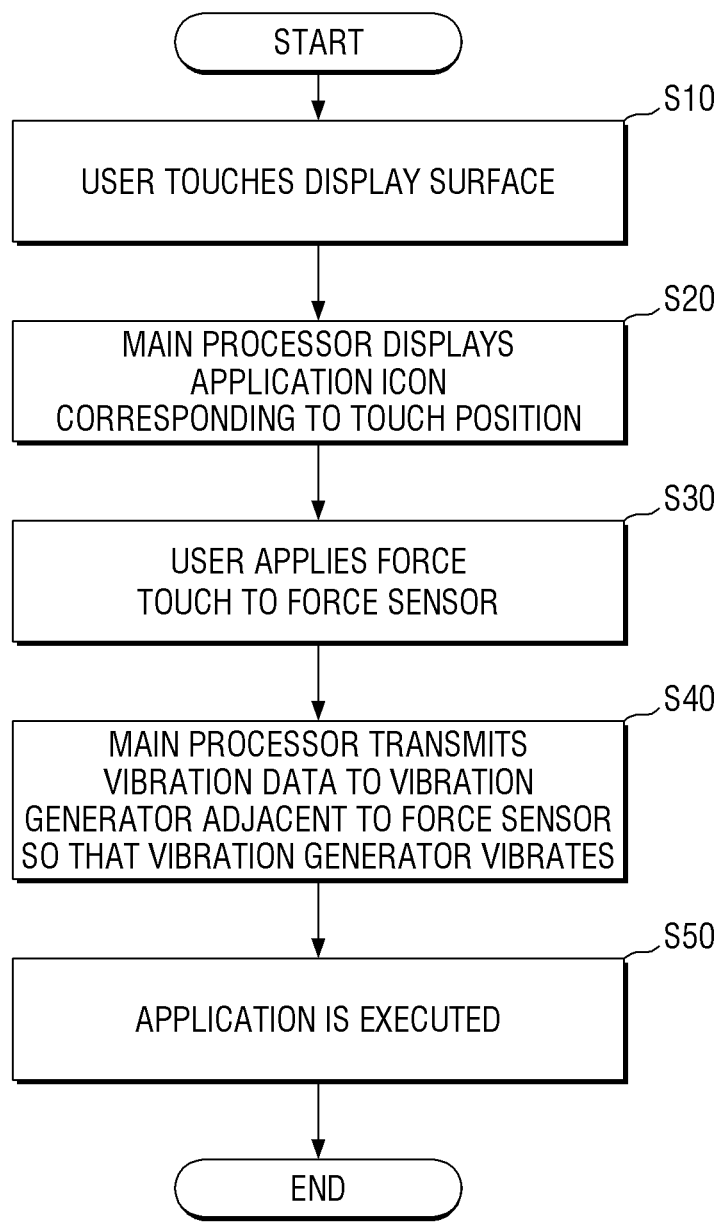
FIG. 23 is a flowchart illustrating a process of executing an application of a display device according to an exemplary embodiment.

FIG. 23 is a flowchart illustrating a process of executing an application of a display device 10 according to an exemplary embodiment.

Referring to FIG. 23, the process of executing an application of the display device 10 according to the exemplary embodiment includes operation S10 in which a user touches a display surface of the display device 10, operation S20 in which a main processor 710 displays an application icon corresponding to the touch position, operation S30 in which the user applies a force touch to each cell group of a force sensor 510 or 520 of the display device 10, operation S40 in which the main processor 710 transmits vibration data to a vibration generator 810 or 820 adjacent to the force sensor 510 or 520 so that the vibration generator 810 or 820 vibrates, and operation S50 in which an application corresponding to the touch position of the user is executed. Since a detailed description related to the above operations has been given above, it will be omitted.

In a display device according to exemplary embodiments, vibration generators adjacent to force sensors are provided. When a user applies a force to each of the force sensors, the vibration generators adjacent to the force censors may generate different vibrations. Thus, the user can feel the different vibrations at the positions where the different vibration generators are disposed.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel;
a first force sensor and a second force sensor disposed below the display panel; and
a first vibration generator and a second vibration generator disposed below the display panel,
wherein:
the first vibration generator is configured to vibrate in response to application of a force to the first force sensor, and the second vibration generator is configured to vibrate in response to application of a force to the second force sensor; and
the vibration of the first vibration generator is always different from the vibration of the second vibration generator.

2. The display device of claim 1, wherein the first vibration generator is disposed adjacent to the first force sensor, and the second vibration generator is disposed adjacent to the second force sensor.

3. The display device of claim 2, wherein the first force sensor is disposed outside the first vibration generator, and the second force sensor is disposed outside the second vibration generator.

4. The display device of claim 1, wherein each of the first force sensor and the second force sensor comprises a plurality of force sensing cells.

5. The display device of claim 4, wherein the first vibration generator is configured to vibrate differently in response to application of a force to any one of the force sensing cells and in response to application of a force to another one of the force sensing cells.

6. The display device of claim 4, wherein the first vibration generator is disposed adjacent to any one of the force sensing cells of the first force sensor and further comprising a third vibration generator disposed adjacent to another one of the force sensing cells of the first force sensor.

7. The display device of claim 6, wherein:
the first vibration generator is configured to vibrate in response to application of a force to any one of the force sensing cells of the first force sensor, and the third vibration generator is configured to vibrate in response to application of a force to another one of the force sensing cells; and
the vibration of the first vibration generator is different from the vibration of the third vibration generator.

8. The display device of claim 7, wherein the second vibration generator is disposed adjacent to any one of the force sensing cells of the second force sensor and further comprises a fourth vibration generator disposed adjacent to another one of the force sensing cells of the second force sensor.

9. The display device of claim 8, wherein:
the second vibration generator is configured to vibrate in response to application of a force to any one of the force sensing cells of the second force sensor, and the fourth vibration generator is configured to vibrate in response to application of a force to another one of the force sensing cells of the second force sensor; and
the vibration of the second vibration generator is different from the vibration of the fourth vibration generator.

10. The display device of claim 4, further comprising:
a lower cover disposed below the display panel; and
a fifth vibration generator disposed on an upper surface of the lower cover.

11. The display device of claim 10, wherein:
any one of the force sensing cells has a first area, and another one of the force sensing cells has a second area; and
the second area is larger than the first area.

12. The display device of claim 11, wherein:
the first vibration generator is configured to vibrate in response to application of a force to any one of the force sensing cells of the first force sensor, and the fifth vibration generator is configured to vibrate in response to application of a force to another one of the force sensing cells of the first force sensor; and
the vibration of the first vibration generator is different from the vibration of the fifth vibration generator.

13. The display device of claim 1, wherein a maximum vibration displacement of the first vibration generator is different from that of the second vibration generator.

14. The display device of claim 1, wherein a duration of the vibration of the first vibration generator is different from that of the vibration of the second vibration generator.

15. The display device of claim 1, wherein a waveform of the vibration of the first vibration generator is different from that of the vibration of the second vibration generator.

16. The display device of claim 1, wherein a period of the vibration of the first vibration generator is different from that of the vibration of the second vibration generator.

17. A display device comprising:
a display panel;
a first force sensor and a second force sensor which are disposed below the display panel; and
a first vibration generator which is disposed below the display panel,
wherein:
the first vibration generator is configured to vibrate in response to application of a force to the first force sensor and the second force sensor; and
the first vibration generator is configured to vibrate always differently in response to application of a force to the first force sensor and in response to application of a force to the second force sensor.

18. The display device of claim 17, wherein the first force sensor is disposed on a first lateral side of the display panel, the second force sensor is disposed on a second lateral side of the display panel opposite the first lateral side, and the first vibration generator is disposed between the first force sensor and the second force sensor.

19. The display device of claim 18, wherein each of the first force sensor and the second force sensor comprises a plurality of force sensing cells, and the first vibration generator is configured to vibrate differently in response to application of a force to any one of the force sensing cells of the first force sensor and in response to application of a force to another one of the force sensing cells.

20. The display device of claim 19, further comprising a second vibration generator disposed below the display panel and disposed between the first force sensor and the second force sensor, wherein:

the first vibration generator is configured to vibrate in response to application of a force to any one of the force sensing cells of the first force sensor, and the second vibration generator is configured to vibrate in response to application of a force to another one of the force sensing cells of the first force sensor; and the vibration of the first vibration generator is different from the vibration of the second vibration generator.

* * * * *